(12) United States Patent
Singh

(10) Patent No.: US 9,290,069 B2
(45) Date of Patent: Mar. 22, 2016

(54) TIRE INNERLINER-BASED PARAMETER ESTIMATION SYSTEM AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 181 days.

(21) Appl. No.: 14/170,706

(22) Filed: Feb. 3, 2014

(65) Prior Publication Data

US 2015/0217607 A1  Aug. 6, 2015

(51) Int. Cl.
*B60C 23/04* (2006.01)
*B60C 23/06* (2006.01)
*B60W 40/13* (2012.01)
*G01G 19/08* (2006.01)
*G01G 19/10* (2006.01)

(52) U.S. Cl.
CPC ......... *B60C 23/0488* (2013.01); *B60C 23/0493* (2013.01); *B60C 23/064* (2013.01); *B60W 40/13* (2013.01); *G01G 19/086* (2013.01); *G01G 19/10* (2013.01)

(58) Field of Classification Search
CPC ...................................................... B60C 23/04
USPC ........................................................ 73/164
See application file for complete search history.

(56) References Cited

U.S. PATENT DOCUMENTS

| 5,971,046 | A | * | 10/1999 | Koch | B60C 23/04 152/152.1 |
|---|---|---|---|---|---|
| 6,962,075 | B2 | | 11/2005 | Bertrand | 73/146 |
| 7,404,317 | B2 | | 7/2008 | Mancosu et al. | 73/146 |
| 7,546,764 | B2 | | 6/2009 | Morinaga et al. | 72/146 |
| 2003/0121319 | A1 | * | 7/2003 | Kojima | B60C 23/061 73/146.2 |
| 2005/0076982 | A1 | * | 4/2005 | Metcalf | B60C 23/0493 152/152.1 |
| 2014/0366618 | A1 | * | 12/2014 | Singh | B60C 23/04 73/146.3 |
| 2014/0371990 | A1 | * | 12/2014 | Steinhardt | G01C 21/165 701/41 |
| 2015/0057877 | A1 | * | 2/2015 | Singh | B60C 11/246 701/34.4 |

* cited by examiner

*Primary Examiner* — Lisa Caputo
*Assistant Examiner* — Jamel Williams
(74) *Attorney, Agent, or Firm* — Richard B. O'Planick

(57) ABSTRACT

A tire inner liner-based estimation system and method for a vehicle includes a tire pressure sensor mounted to a vehicle tire for detecting a measured tire air cavity pressure; a vehicle speed sensor mounted to provide a measured vehicle speed; a tire identification device mounted to the tire for conveying a tire identification; a tire inner liner deflection sensor mounted to detect and measure a loaded inner liner radius. An estimation of an inner liner-based parameter is iteratively made from the measured tire pressure and the loaded inner liner radius measurement.

7 Claims, 37 Drawing Sheets

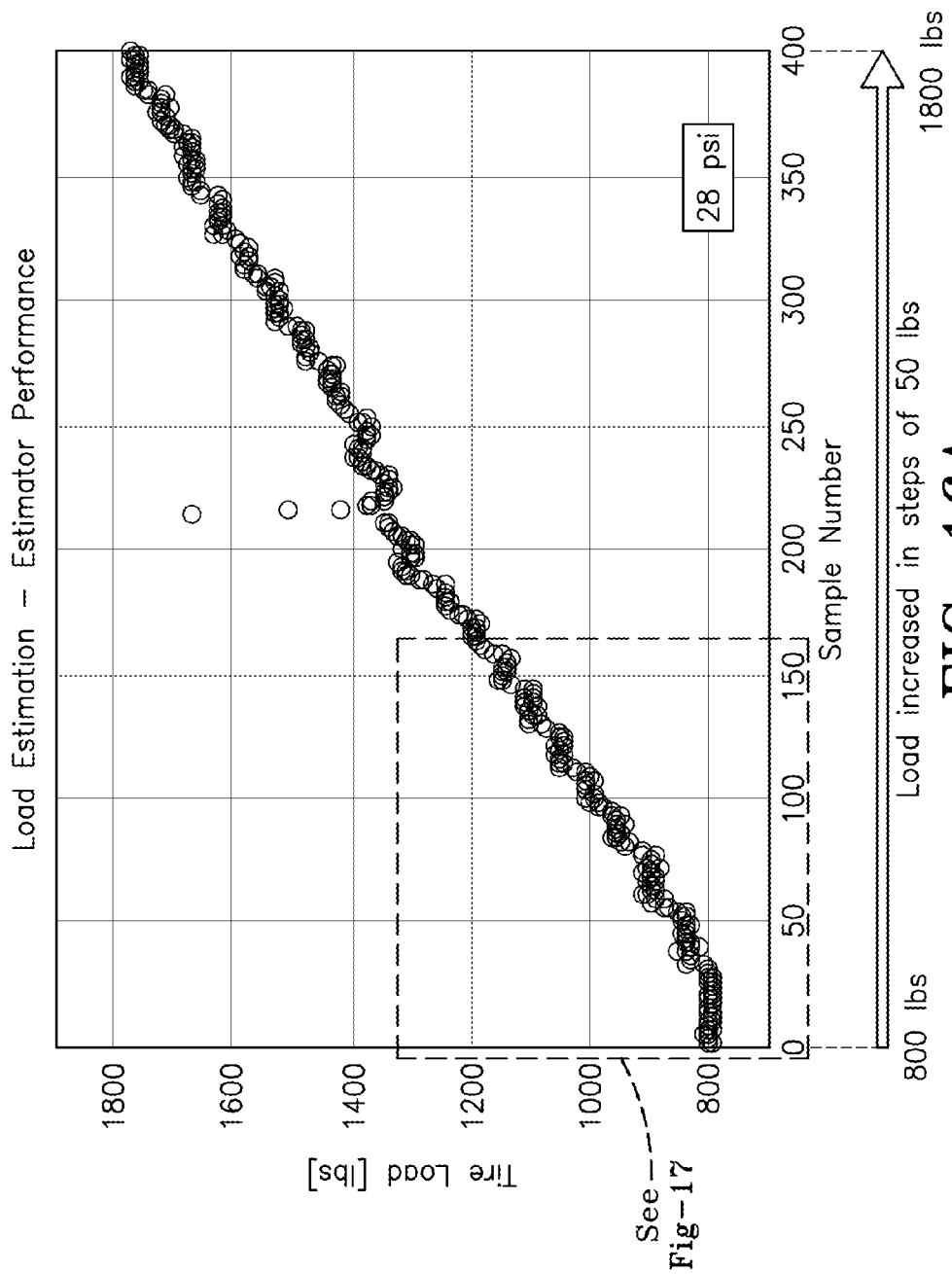

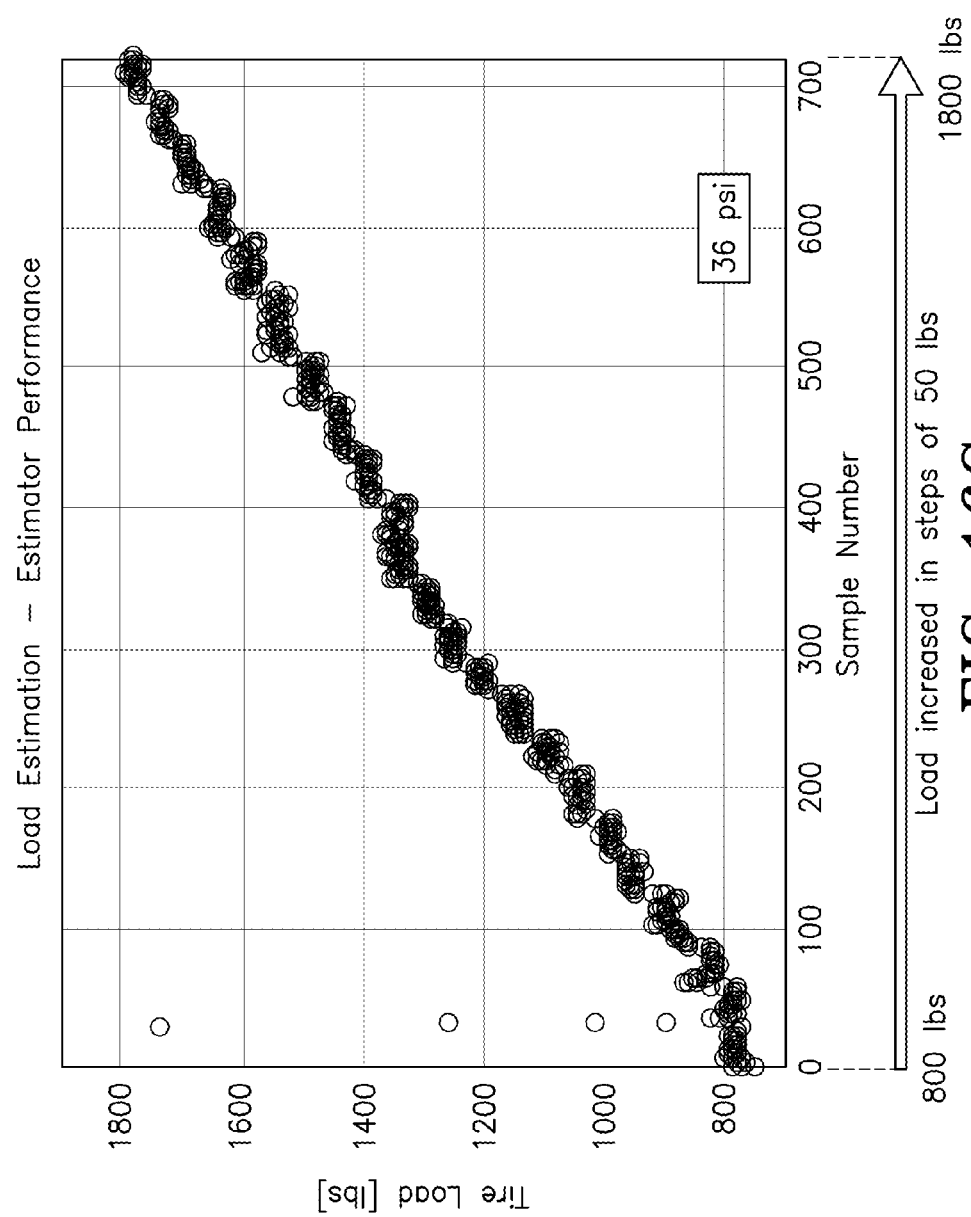

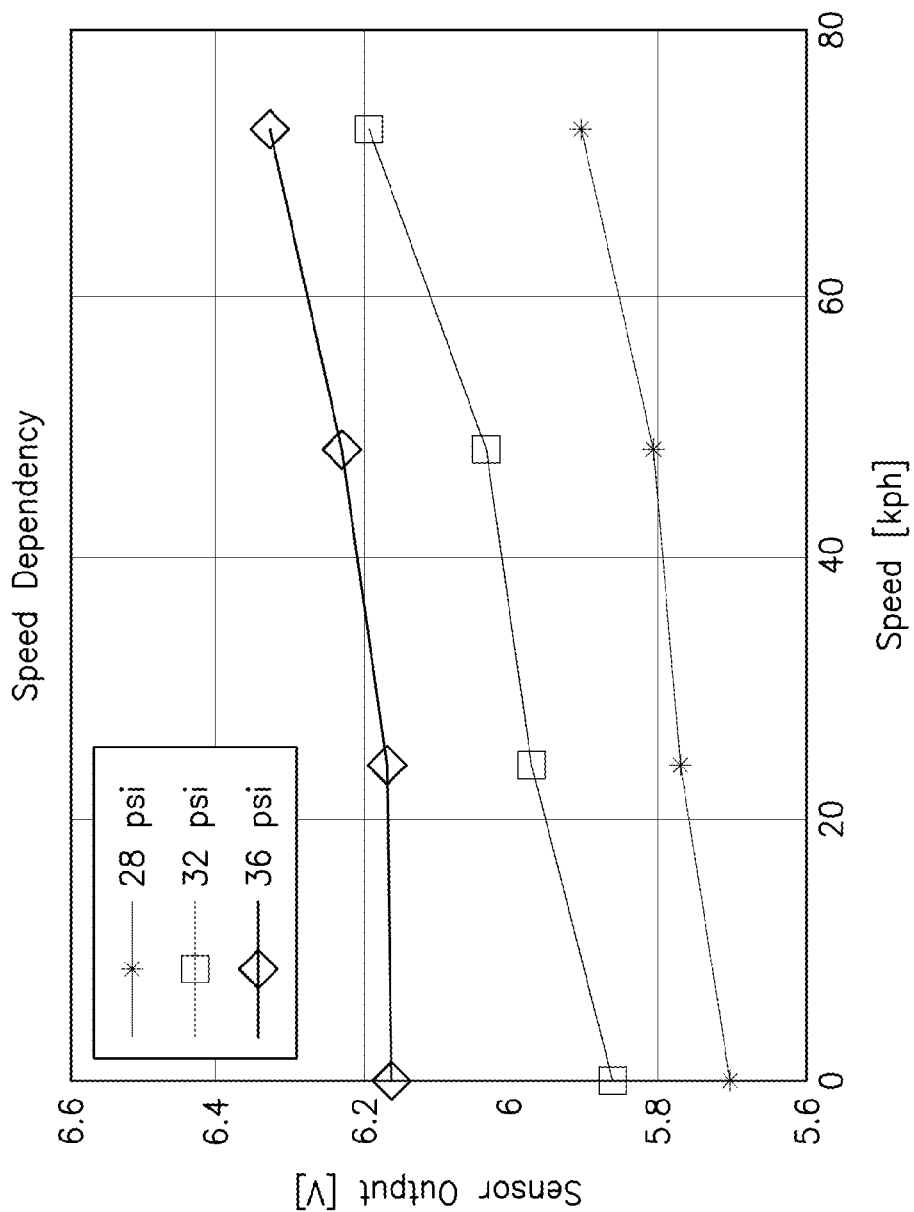

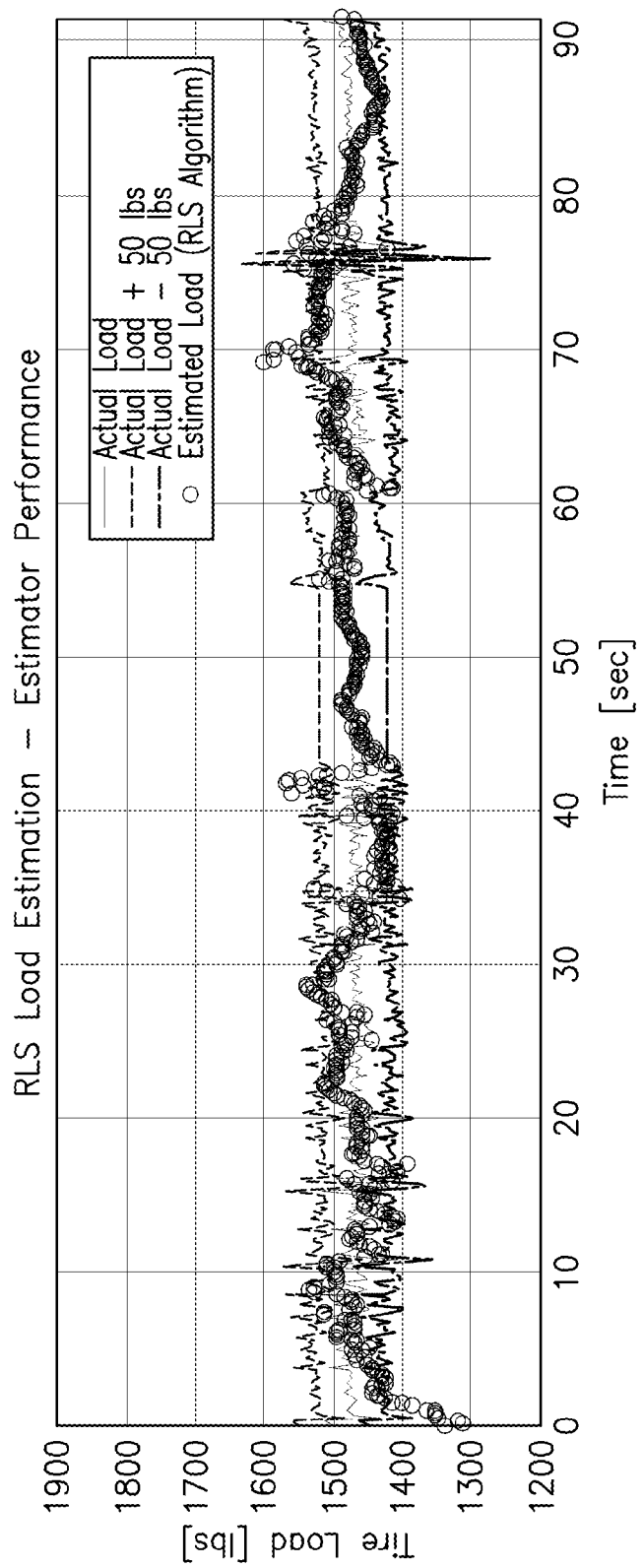

TIRE INNERLINER-BASED PARAMETER ESTIMATION SYSTEM AND METHOD

FIELD OF THE INVENTION

The subject invention relates generally to systems for estimating a vehicle parameter and, more specifically, to a tire based vehicle parameter estimation system and method.

BACKGROUND OF THE INVENTION

Estimation of certain vehicle parameters, such as a tire load estimation, are useful input in advanced vehicle control systems such as brake control systems. With the use of a tire load estimation, electronic brake distribution (EBD) systems can optimize braking system performance and reduce vehicle stopping distance. Typical tire load estimation systems have been developed that utilize tire contact patch length measurement to estimate tire loading. While working well, measurement of tire patch length can prove problematic due to the sensor durability issues inherent in such systems, sensor interconnection and attachment related issues and sensor position related issues. Accordingly, an improved system and method for estimating vehicle parameters including tire load that is reliable, accurate, and durable is desired for use in vehicle control systems.

SUMMARY OF THE INVENTION

An inner liner-based estimation system and method for a vehicle parameter includes one or more tire pressure sensors mounted to a vehicle tire for detecting a measured tire air cavity pressure; one or more vehicle speed sensors mounted to provide a measured vehicle speed; a tire identification device mounted to the tire for providing a tire identification; and one or more tire inner liner deflection sensors mounted to provide a loaded inner liner radius measurement. An estimation of a vehicle parameter is made from the measured tire pressure and the loaded inner liner radius measurement.

In another aspect of the invention, the estimation is made through an estimation recursive least squares algorithm receiving as inputs the tire identification, the measured tire air cavity pressure, the loaded inner liner radius measurement and the measured vehicle speed. The algorithm employed is a linear filter model such as a Kalman filter. The estimation of the vehicle parameter is preferably made iteratively at a preselected sampling frequency.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Recursive least squares (RLS)" means an adaptive filter algorithm which recursively finds the filter coefficients that minimize a weighted linear least squares cost function relating to the input signals.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 16A is a load sweep test result graph showing estimator performance at a 28 psi inflation.

FIG. 16C is a load sweep test result graph showing estimator performance at a 36 psi inflation.

FIG. 19A is a graph showing speed dependency in the estimation.

FIG. 25B is a graph of tire load RLS estimation test results over public roads.

DETAILED DESCRIPTION OF THE INVENTION

Figure 26:
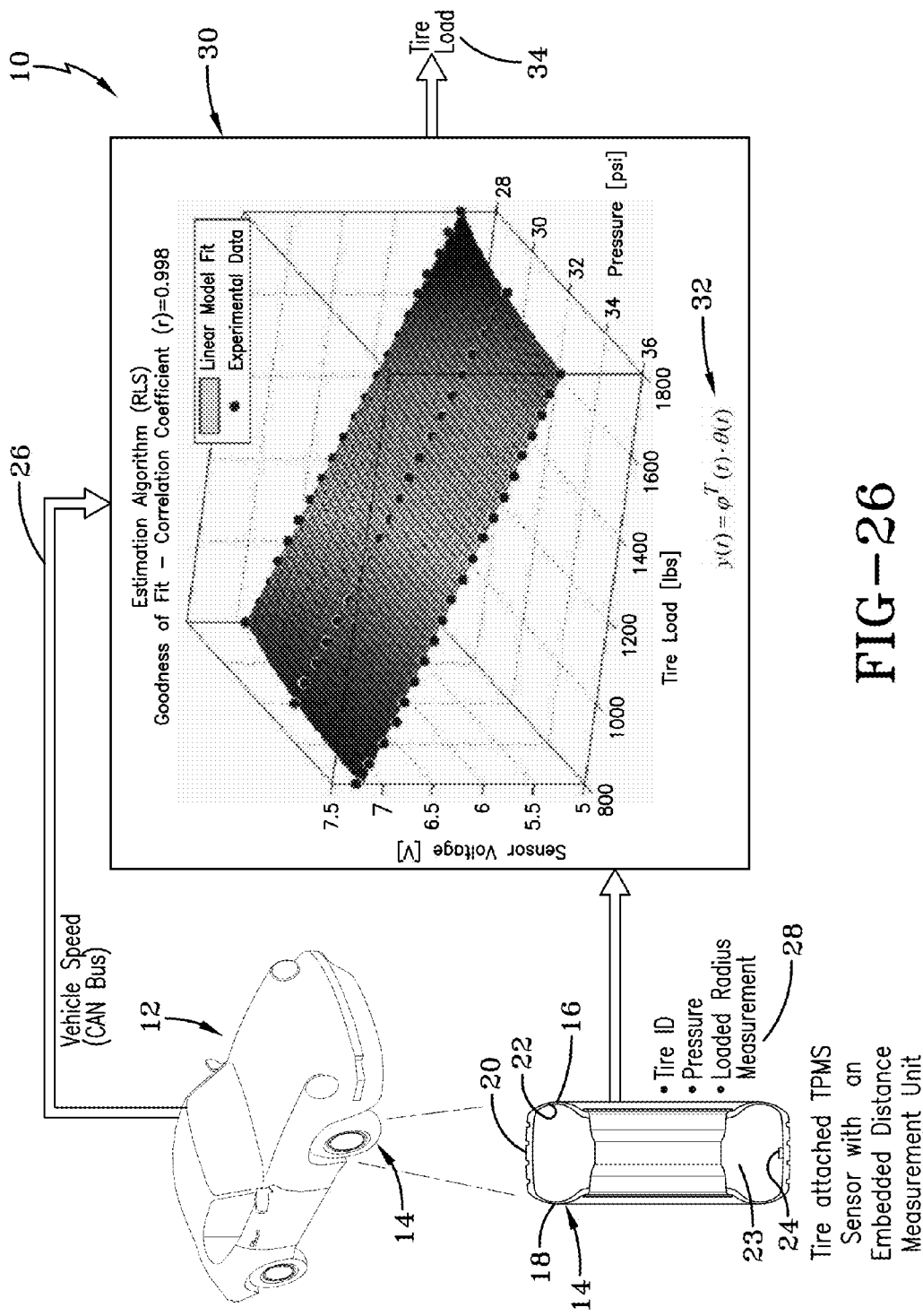
FIG. 26 is a schematic representation of the load estimation system and method.

Referring to FIG. 26, the subject inner liner-based vehicle parameter estimation system and method 10 is shown in a tire load estimating application for the purpose of illustration. The subject invention relates to a tire inner liner-based system and method for estimating a "vehicle parameter". As used herein, "vehicle parameter" is used in a broad sense to include a parameter relating to general vehicle use (e.g. road traversing terrain slope or bank) or a parameter that is tire specific (e.g. tire loading, slip angle). The subject invention, therefore, in its broad sense, is related to a system and method that detects and utilizes tire inner liner deflection for the purpose of estimating any and all vehicle parameters that may be find such inner liner deflection detection and measurement a useful estimation input. Such "vehicle parameters" include but are not limited to: tire-specific loading, vehicle total loading, tire longitudinal force, vehicle road surface bank angle, vehicle road surface grade angle and/or vehicle sideslip angle. For the purpose of explanation, the following specification uses as an example an estimation of tire load as the vehicle parameter. However, it is understood that the invention may be useful in estimating other vehicle parameters, including but not limited to those listed above.

The purpose of system 10, in the exemplary application of tire load estimation described below, is to obtain static load from a vehicle tire attached tire pressure monitoring system (TPMS). To facilitate the estimation of a static load, the subject system employs a distance measurement sensor attached to a tire by means of embedding the sensor or attaching the sensor to a tire inner liner by adhesive. The information obtained from tire based sensors is used to estimate a tire by tire loading, and ultimately, a comprehensive vehicle loading. The loading and, in particular, the estimated load distribution by tire can be profitably used by advanced brake control systems like the electronic brake distribution (EBD) system to optimize the brake system performance and reduce vehicle stopping distance. In the case of a commercial vehicle, the weight estimated on each wheel can be averaged to produce an estimate of the vehicle weight. The vehicle weight may then be transmitted to a central location such as a weigh station, eliminating the need for a conventional weigh station stop.

The system 10 is shown in use for a passenger car 12, it being understood that the load estimation system 10 can be used in all wheeled vehicle applications. The load estimation is conducted for each vehicle tire 14. The tires 14 are of conventional construction, having tire sidewalls 16, 18, and crown 20, enclosing a tire cavity 23 bounded by a tire inner liner layer 22. Mounted to each tire 14 is a TPMS module 24 having one or more tire pressure measuring sensors for measuring the inflation pressure within the cavity 23. The TPMS module 24 may further include tire-specific identification data and a temperature sensor for monitoring the temperature of the tire. The data generated by the TPMS module 24 and its sensor system is accessible by wireless communication from the module 24 to a receiver (not shown) located remotely or in the vehicle electronic control unit. Information reflecting TPMS monitoring of each tire may be displayed visibly to an operator and/or used in electronic evaluation of each tire.

As represented in FIG. 26, the vehicle 12 is further equipped with a vehicle speed sensor that electronically conveys vehicle speed by CANBus 26 to a processing unit. The vehicle speed may thus be used to control vehicle systems such as braking. Pursuant to the subject system 10, a distance measurement device is mounted to each tire 14 for the purpose of measuring the radius of the tire. The distance measurement device may be mounted to the tire inner liner 23 separated, or preferably, incorporated into and part of the TPMS module 24 embedded within or adhered to the tire inner liner 23. Mounted to the vehicle inner liner, the distance measurement device operably measures the radius of loaded tire over road or other surfaces and transmits radius data from the tire to a receiver for processing. The distance measurement device may be in the form of conventionally available commercial sensors such as laser distance sensors, eddy current sensors, magneto-inductive sensors, capacitance sensors or other known sensor devices.

The loaded radius measurement from the distance measurement device, together with the vehicle speed data and tire pressure data, form inputs 28 to an estimation algorithm 30 from which a load estimation is made. The estimation algorithm 30 preferably utilizes an adaptive filter in deriving the desired load estimation, such as a Kalman or other known adaptive filters that perform a recursive least squares (RLS) analysis. The estimation algorithm 30, may be generally defined as shown by statement 32:

$$y(t) = \Phi(t) \cdot \theta(t)$$

Where:
y(t) is the output vector
$\Phi(t)$ is the regression vector
$\theta(t)$ is the unknown parameter By an iterative execution of the formula on a known periodic frequency basis, an estimation of the tire load may be made.

Figure 1A:
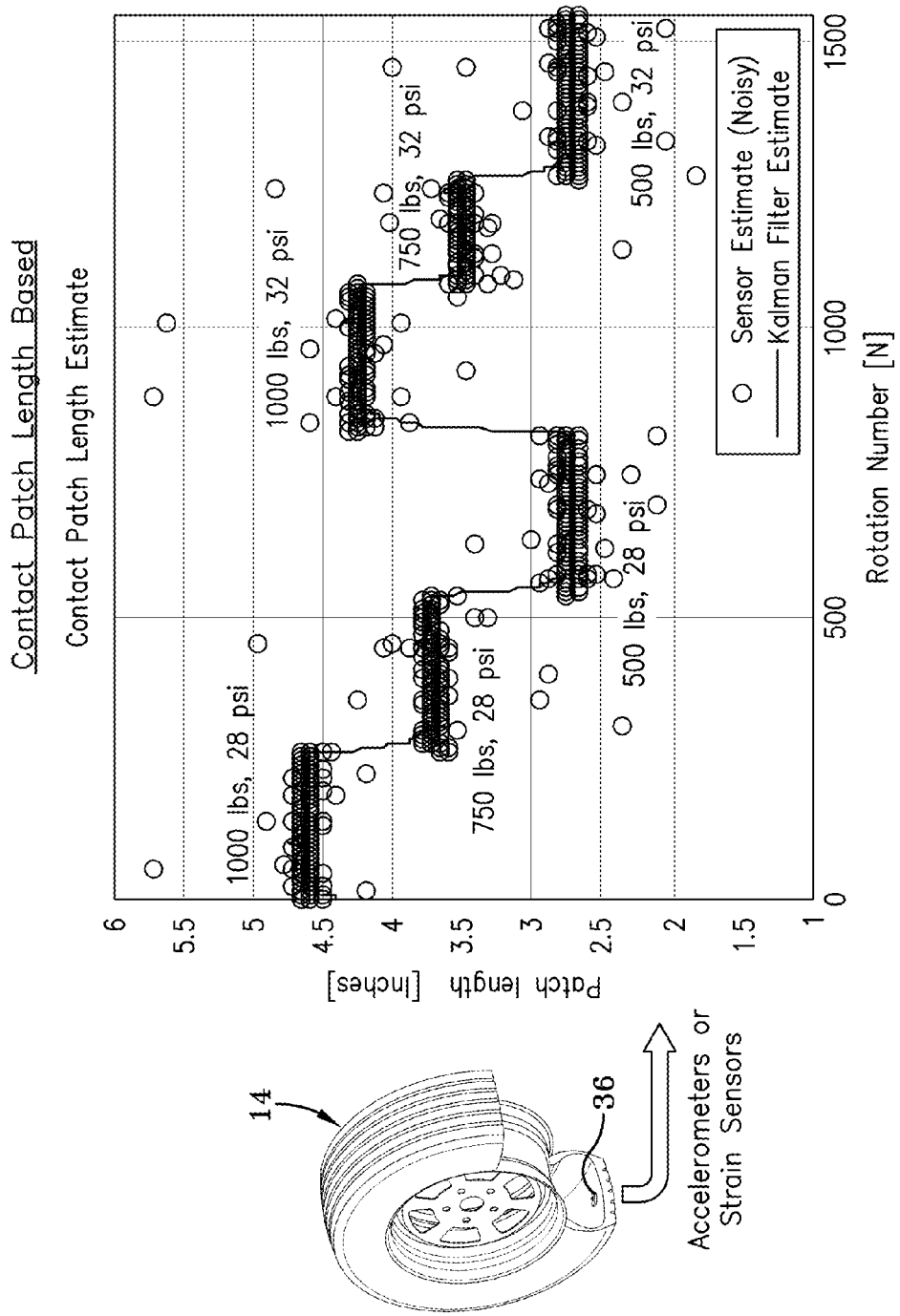
FIG. 1A is a graph comparing a sensor estimate vs. a Kalman Filter estimation in a patch length estimation system.
Figure 1B:
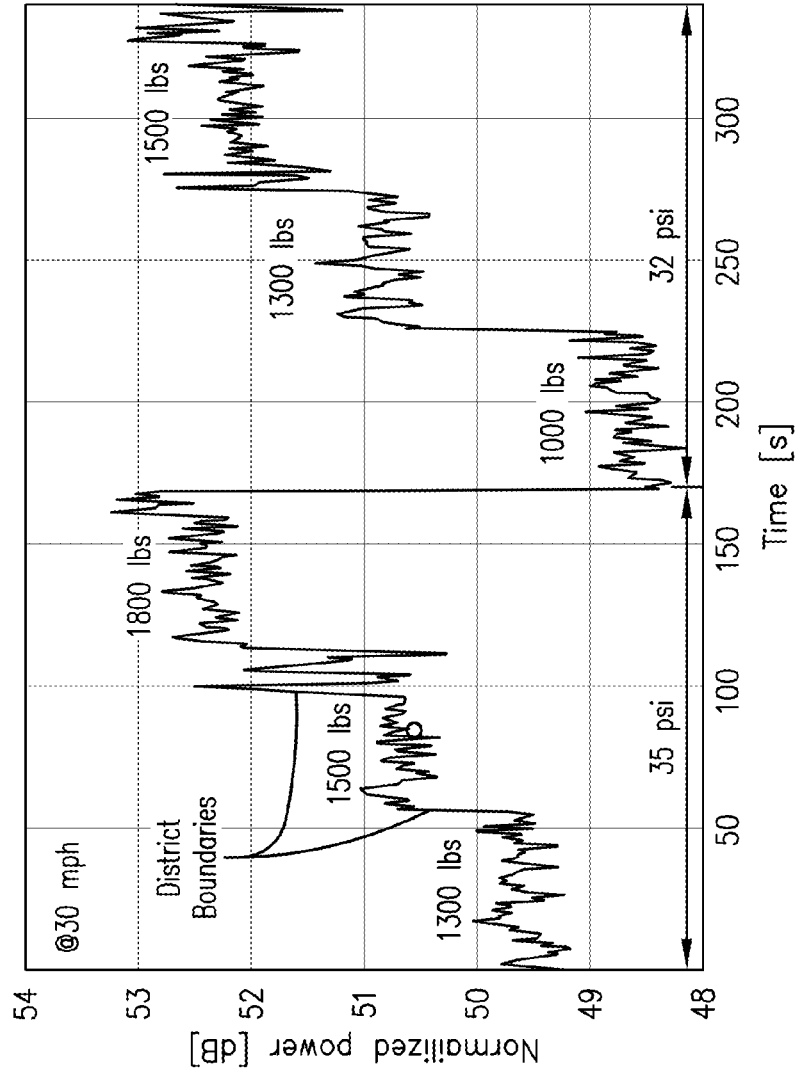
FIG. 1B is a graph of signal power per revolution in a contact radial acceleration amplitude based load estimation system.
Figure 1B:
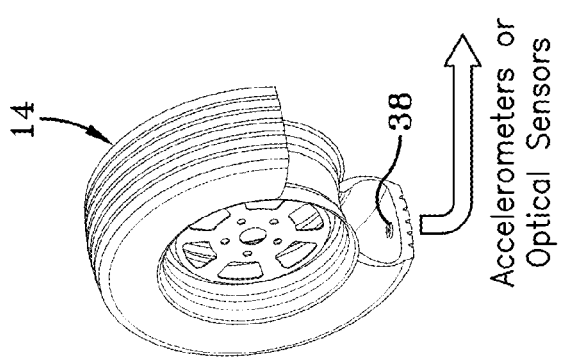
Figure 1C:
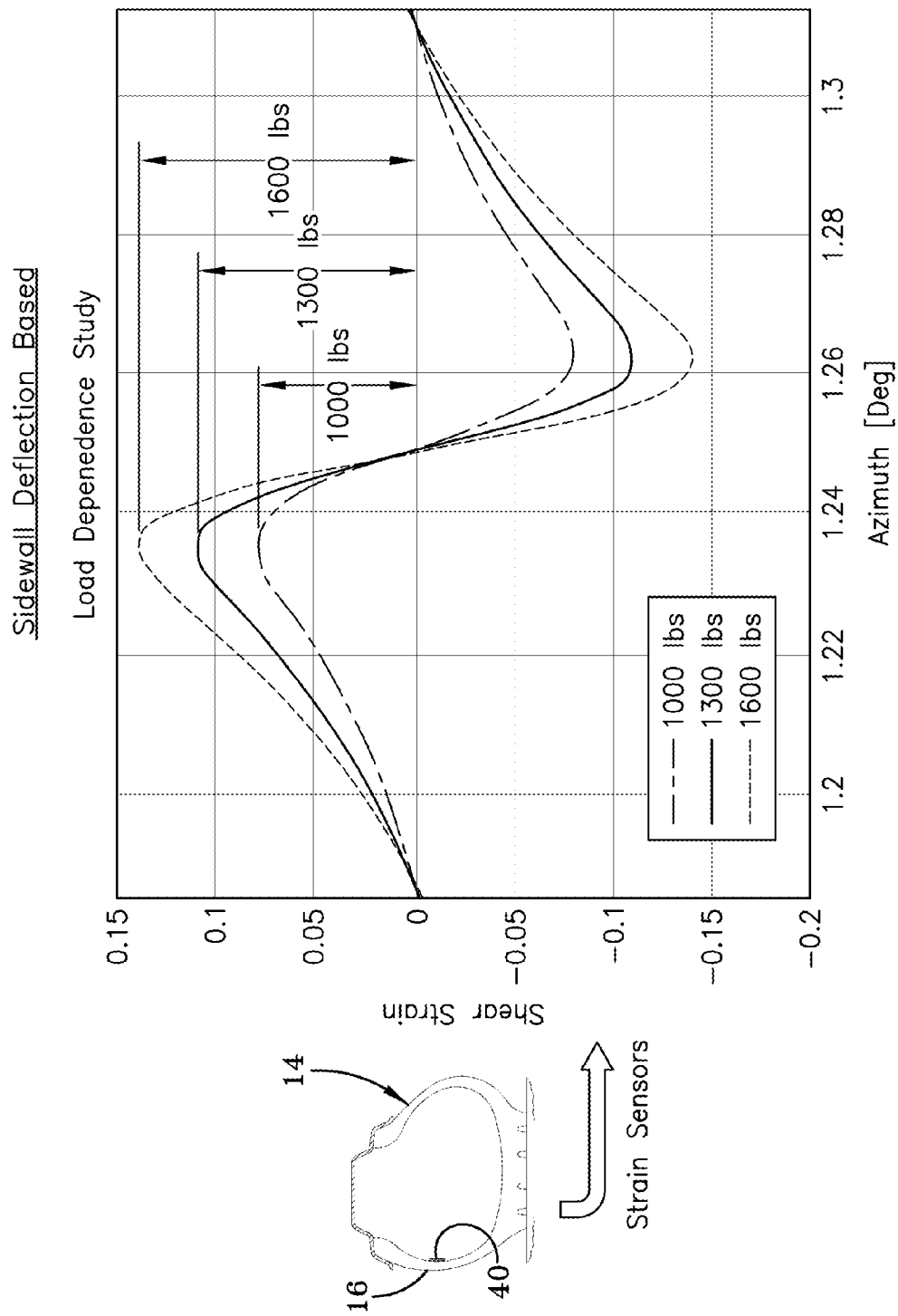
FIG. 1C is a graph of shear strain vs. azimuth for three load levels in a sidewall deflection based load estimation system.

By way of background, FIG. 1A shows a known sensing technique for measuring tire load through the use of tire contact length measurement. Accelerometers or strain sensors 36 are mounted to a tire 14 and mark the beginning and end of a contact patch length as the tire rotates. The graph of FIG. 1A shows patch length (inches) vs. rotation number for the sensor estimate (noisy) and a Kalman Filter estimate. FIG. 1B shows another alternative known technique for tire load estimation using accelerometers or optical sensor 38 mounted to tire 14. This technique determines contact patch radial acceleration amplitude and estimates tire loading therefrom. The total signal power per revolution is measured. The FIG. 1B graph of normalized power (dB) over time at 30 mph shows the boundaries for different tire loadings. By measuring power of tire deflection, an estimate of tire loading may be made. FIG. 1C shows yet another known technique for tire load estimation in which a strain sensor 40 is affixed to the sidewall 16 of a tire 14 and measures sidewall shear strain. Plotting shear strain vs. azimuth (Deg.) in FIG. 1C, it will be seen that the load dependence study graphs verify that shear strain is proportionate for different tire sidewall loadings and that, by measuring shear strain, an estimation of tire loading may be made.

Figure 2:
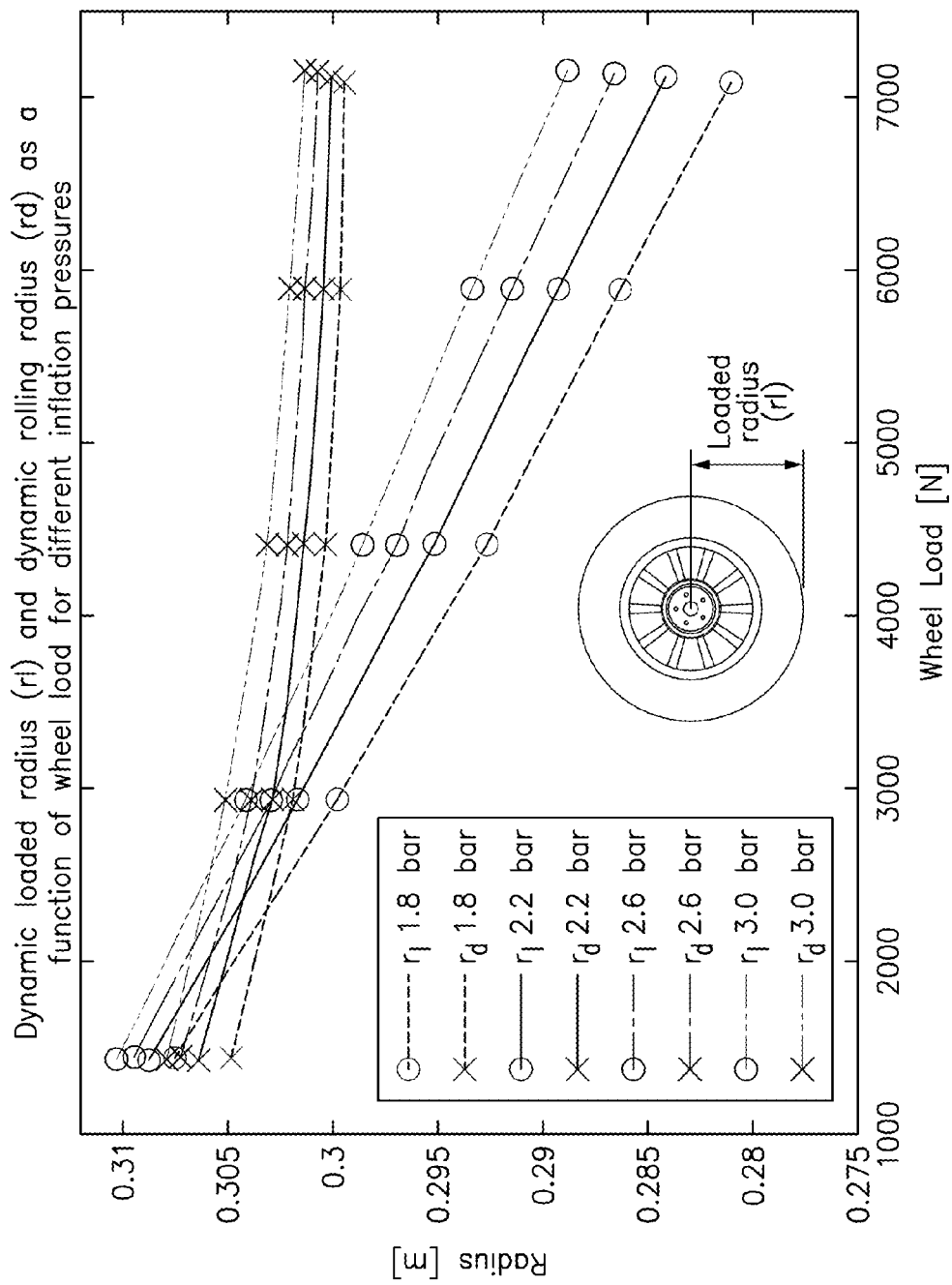
FIG. 2 is a graph of dynamic loaded radius and dynamic rolling radius as a function of wheel load for different inflation pressures.

The subject invention utilizes the relationship of tire dynamic radius in an estimation of tire load. FIG. 2 shows a graph of tire radius (m) vs. wheel load (N) and demonstrates dynamic loaded radius (rl) and dynamic rolling radius (rd) as a function of wheel load for different inflation pressures. The FIG. 2 shows how the dynamic loaded radius (rl) has a nearly linear dependence on wheel load and pressure but the dynamic rolling radius (rd) is not so strongly affected by these factors. It will be appreciated that the tire carcass circumference is defined by stiff tire reinforcement belts typical for a radial tire structure. Thus, whatever the shape of the belt due to, for example, loading conditions, it travels approximately the same distance in each rotation of the tire.

Figure 4:
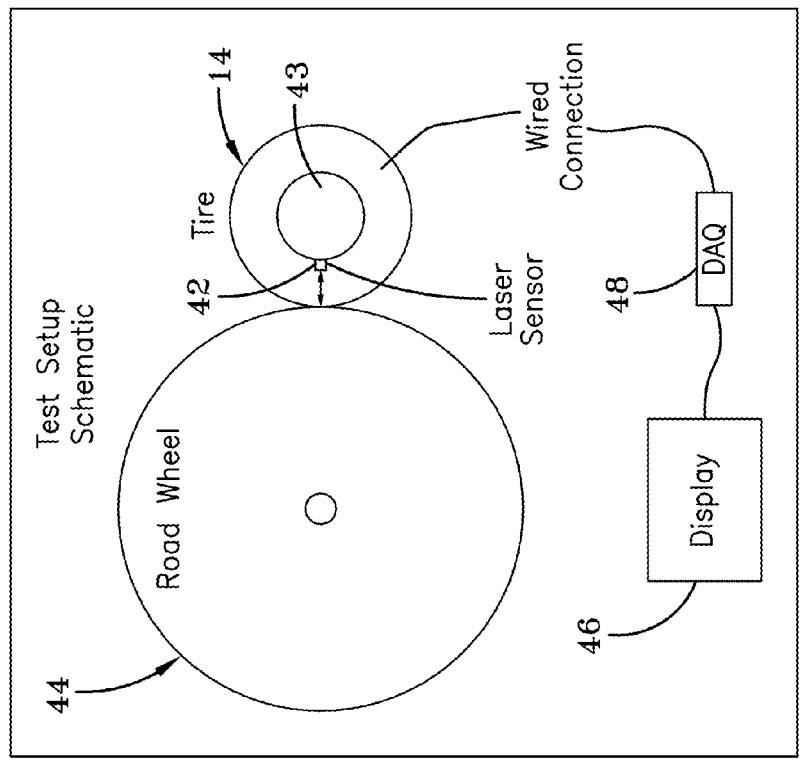
FIG. 4 is a test setup schematic drawing for in an inner liner radius measurement based load estimation system.
Figure 3:
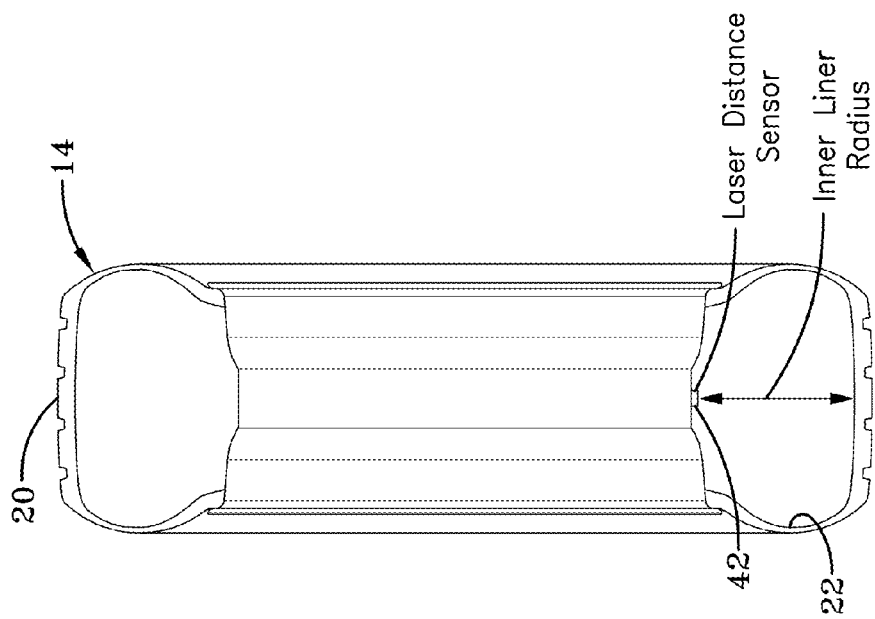
FIG. 3 is a diagrammatic section view of a tire and sensor assembly in an inner liner radius measurement based load estimation system.
Figure 5:
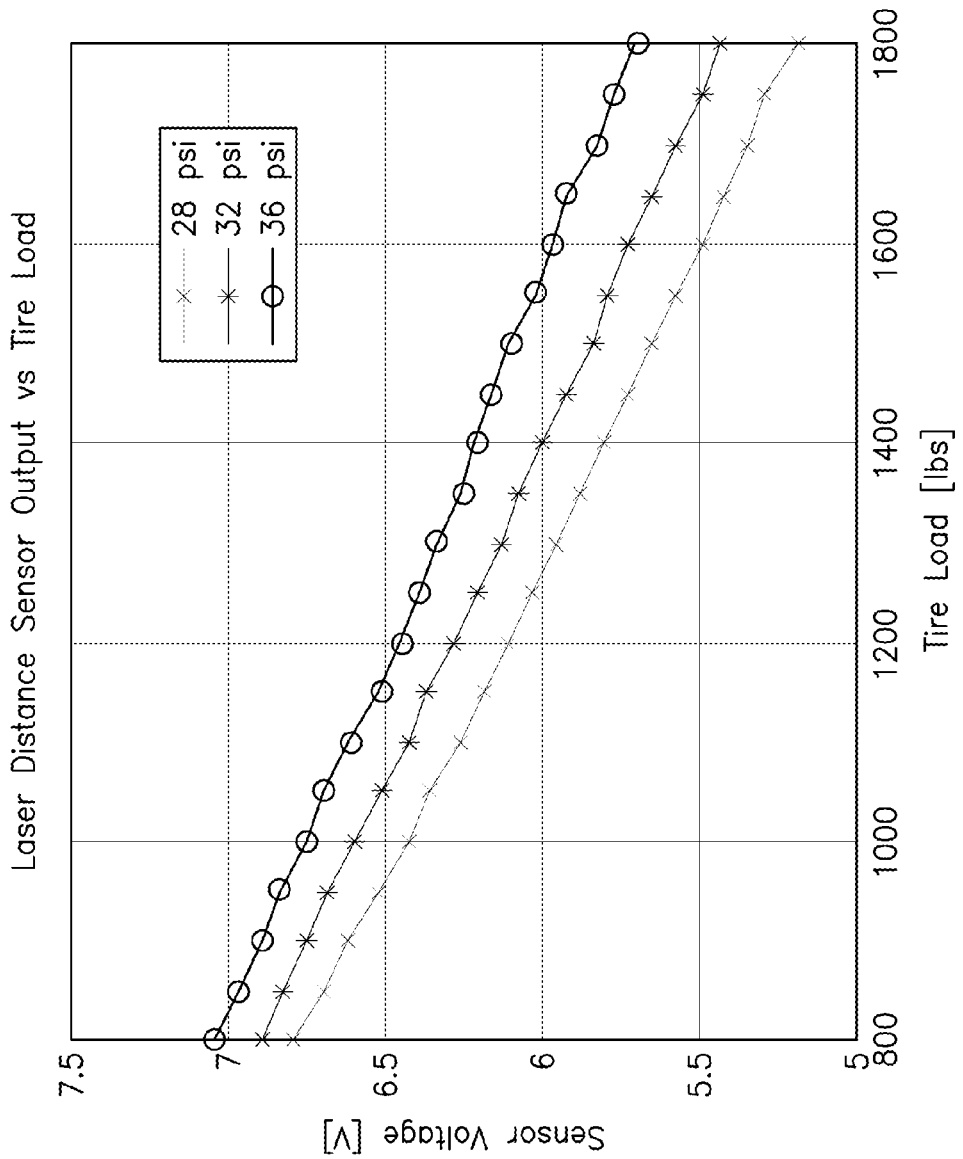
FIG. 5 is a graph of sensor voltage vs. load for different inflation pressures.

FIGS. 3 and 4 show the test schematic used to verify the subject load estimation system and method. A tire 14 is adapted to have a laser distance sensor 42 affixed to a test wheel fixture 43 and positioned to measure the radius of a tire 14 mounted to the wheel 43. The sensor 42 is positioned within its measurement range specification. The tire 14 and wheel 43 are positioned against road wheel 44 with the sensor 42 hardwired to a computer display 46 through data acquisition and power supply unit 48. The road wheel 44 rotates against the tire 14 and simulates loading on the tire. The tests conducted estimate the sensor sensitivity as a function of the tire load by varying the load from 800 pounds to 1800 pounds in steps of 50 pounds, under different inflation pressure conditions of 28, 32 and 36 psi. The tire inner liner 22 at an inner liner region radially inward from the tire tread or crown 20. The results of the loaded radius static load testing is summarized in the graph of FIG. 5. A linear trend is verified in the data, indicating that tire carcass radial deflection is directly proportional to the static load. Good sensitivity/resolution is indicated, validating that relatively small changes in the carcass radial deflection for a 50 pound step size increment was detected.

Figure 6:
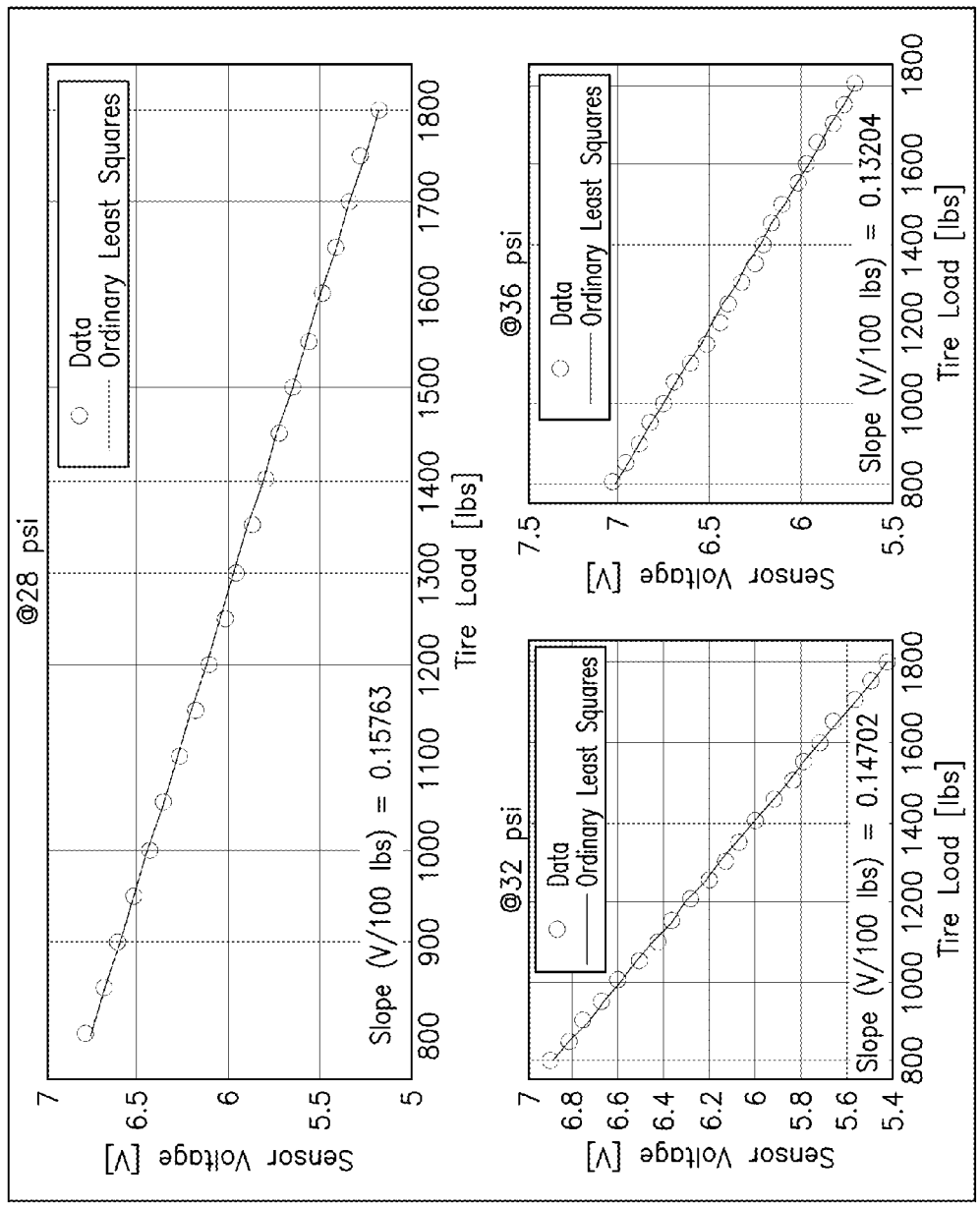
FIG. 6 are graphs of test results comparing data against ordinary least squares load estimations for different inflation pressures.

FIG. 6 shows graphs of sensor output to load sensitivity for the three inflation pressures at a loading of 100 pounds. The data is graphed with the estimated ordinary least squares prediction of loading. The slopes of the lines are identified in the graphs and illustrate that the slope drops as inflation pressure is increased due to the stiffening effect of the tire at higher inflation pressures. The sensitivity (slope V/100 pounds) for each of the inflation pressures is shown.

Figure 7:
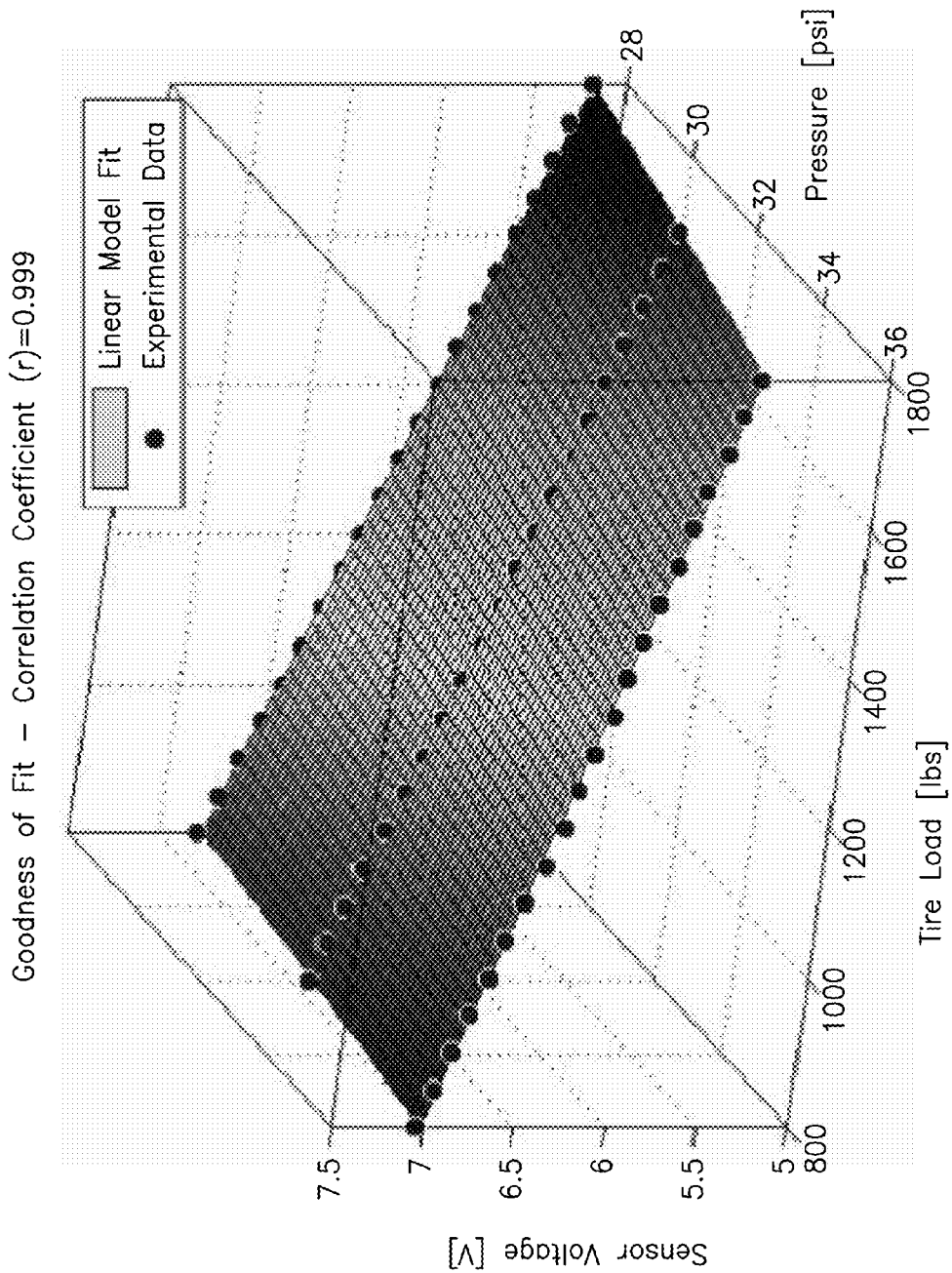
FIG. 7 is a three dimensional graph of sensor voltage vs. load comparing linear model fit and experimental data showing goodness of fit.

Model fitting is shown three dimensionally in the graph of FIG. 7 where linear model fit is compared against experimental data using a Correlation Coefficient (r)=0.999. Sensor Voltage (V) is graphed against tire load (pounds) and tire pressure (psi). Model fit may be expressed as:

Sensor Voltage[$V$]=$p00+p10$*pressure+$p01$*load+ $p20$*pressure^2+$p11$*pressure*load Coefficients with 95 percent confidence bounds:
p00=8.448 (7.851, 9.045)
p10=−0.03205 (−0.06837, 0.004272)
p01=−0.002479 (−0.002617, −0.002342)
p20=−0.0006071 (4.67e-05, 0.001168)
p11=3.199e-05 (2.771e-05, 3.626e-05).

Figure 8:
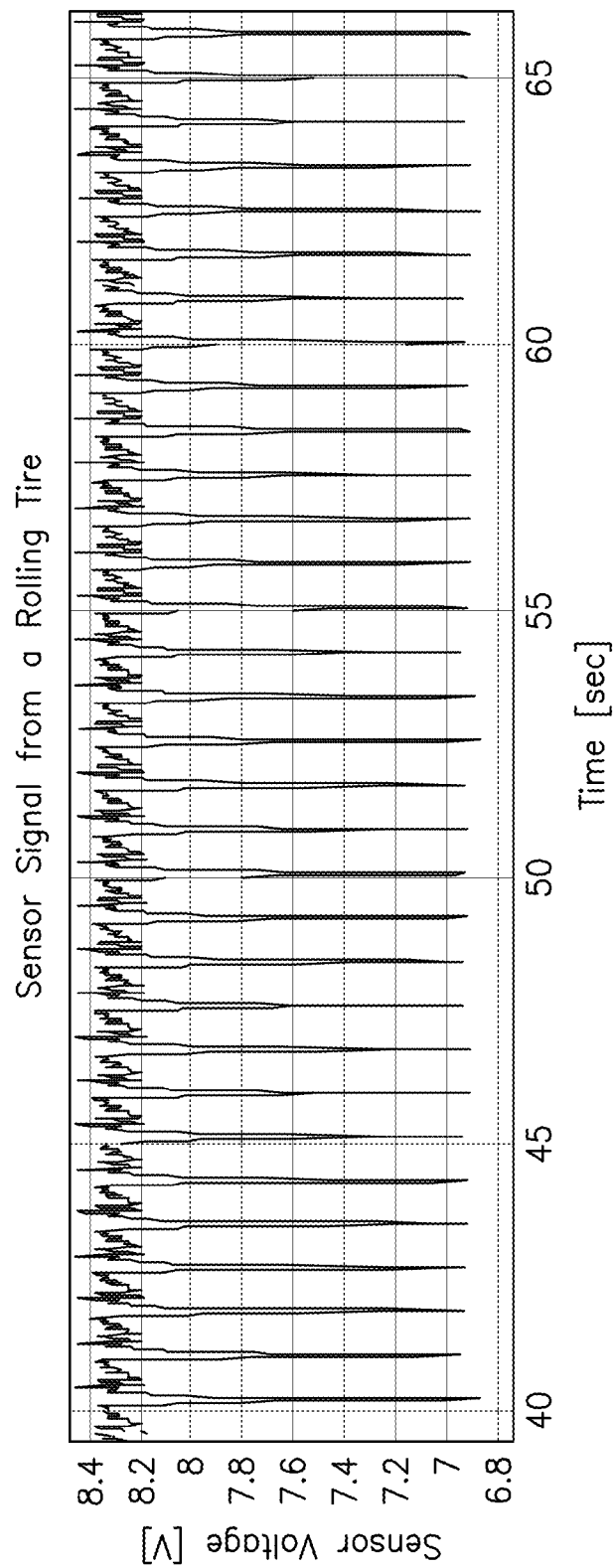
FIG. 8 is a graph of sensor signals from a rolling tire over time.

From the results, a polynomial model (second-order in pressure and first-order in load) was concluded gave a good fit. The sensor signal from the rolling tire is shown in the rolling test results of FIG. 8 as sensor voltage (V) over time.

Figure 9:
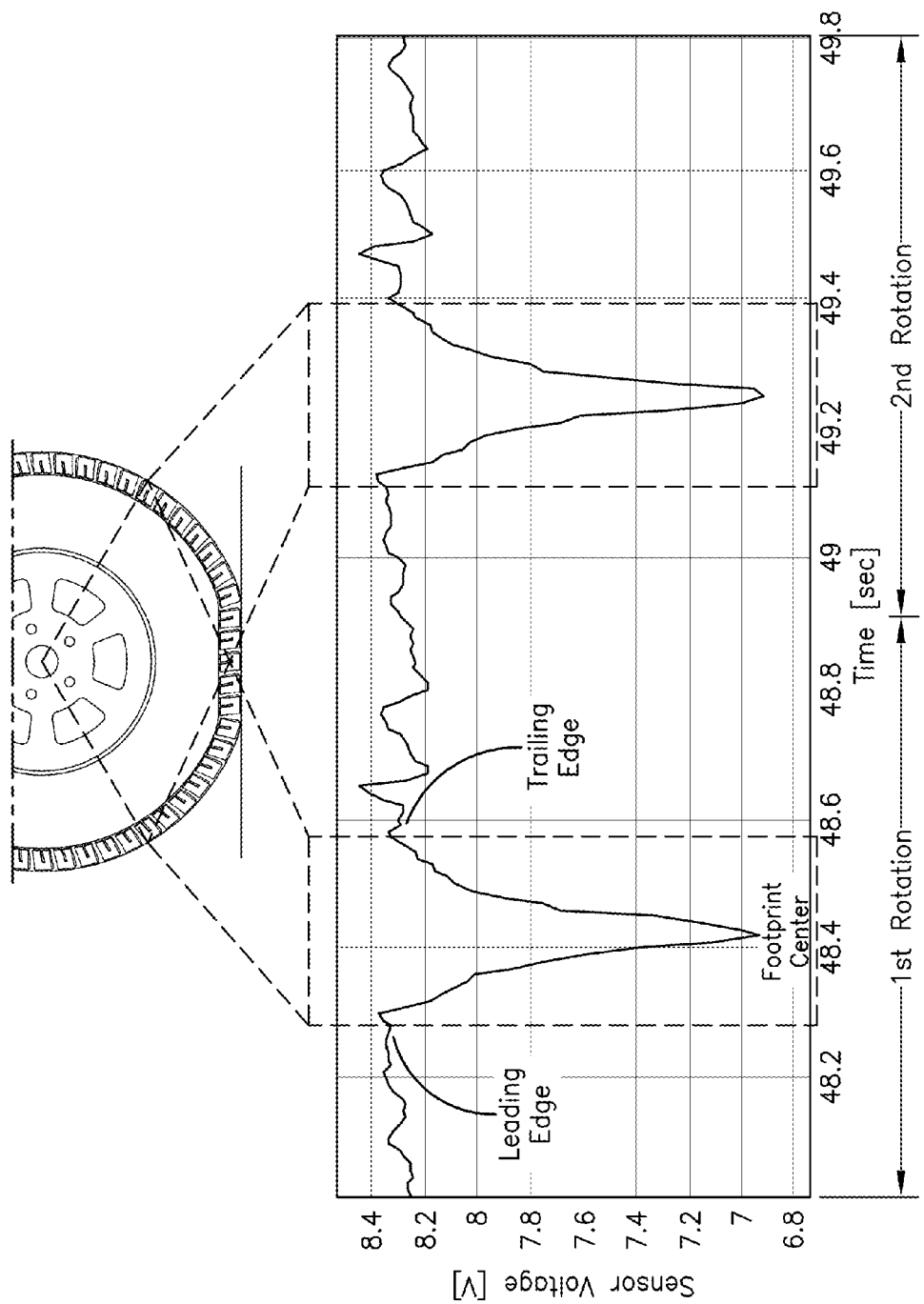
FIG. 9 is a graph of the shape of a sensor signal from a rolling tire.
Figure 10:
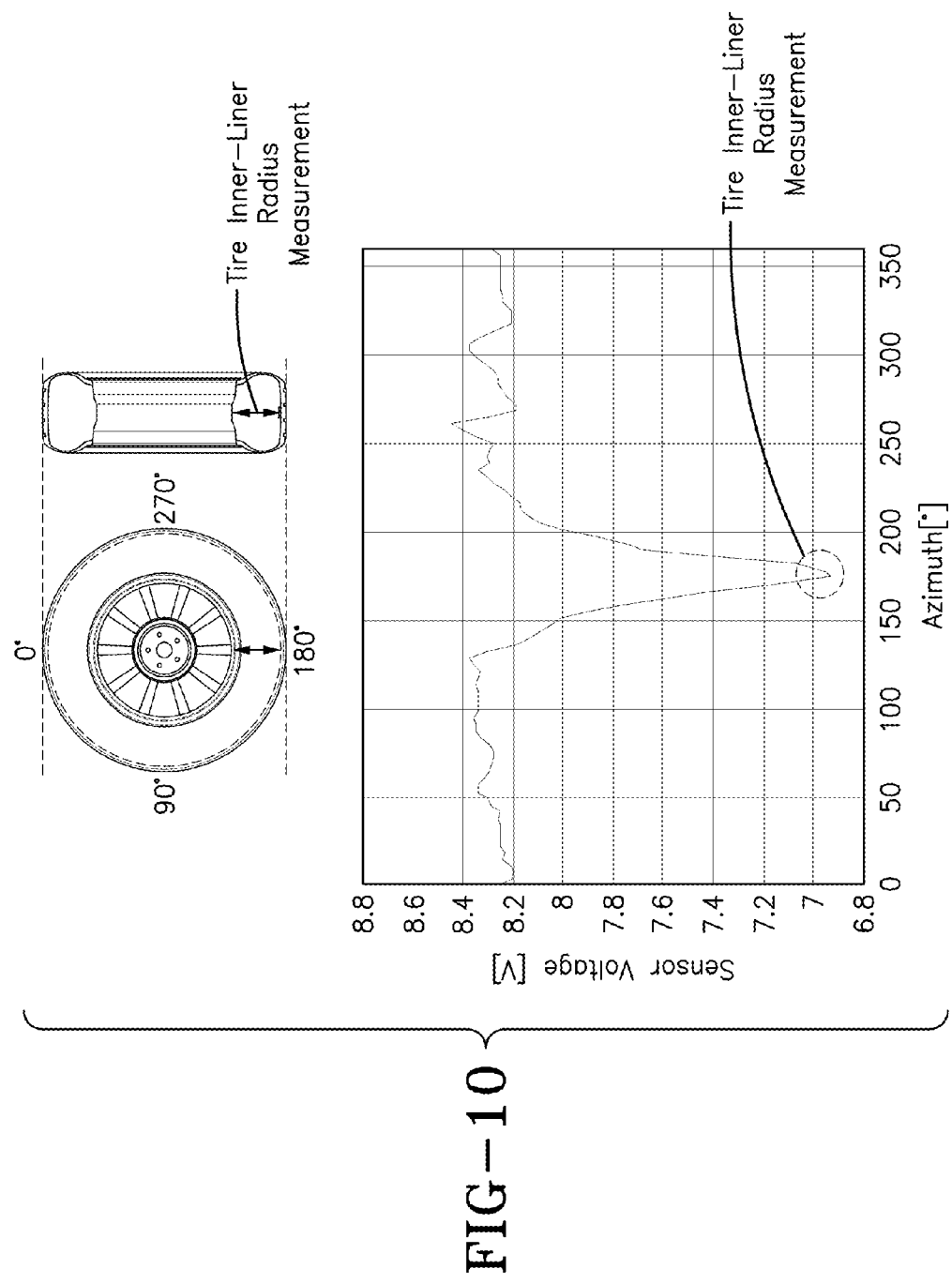
FIG. 10 is a graphed raw signal profile showing inner liner displacement as a function of rotation angle.
Figure 11:
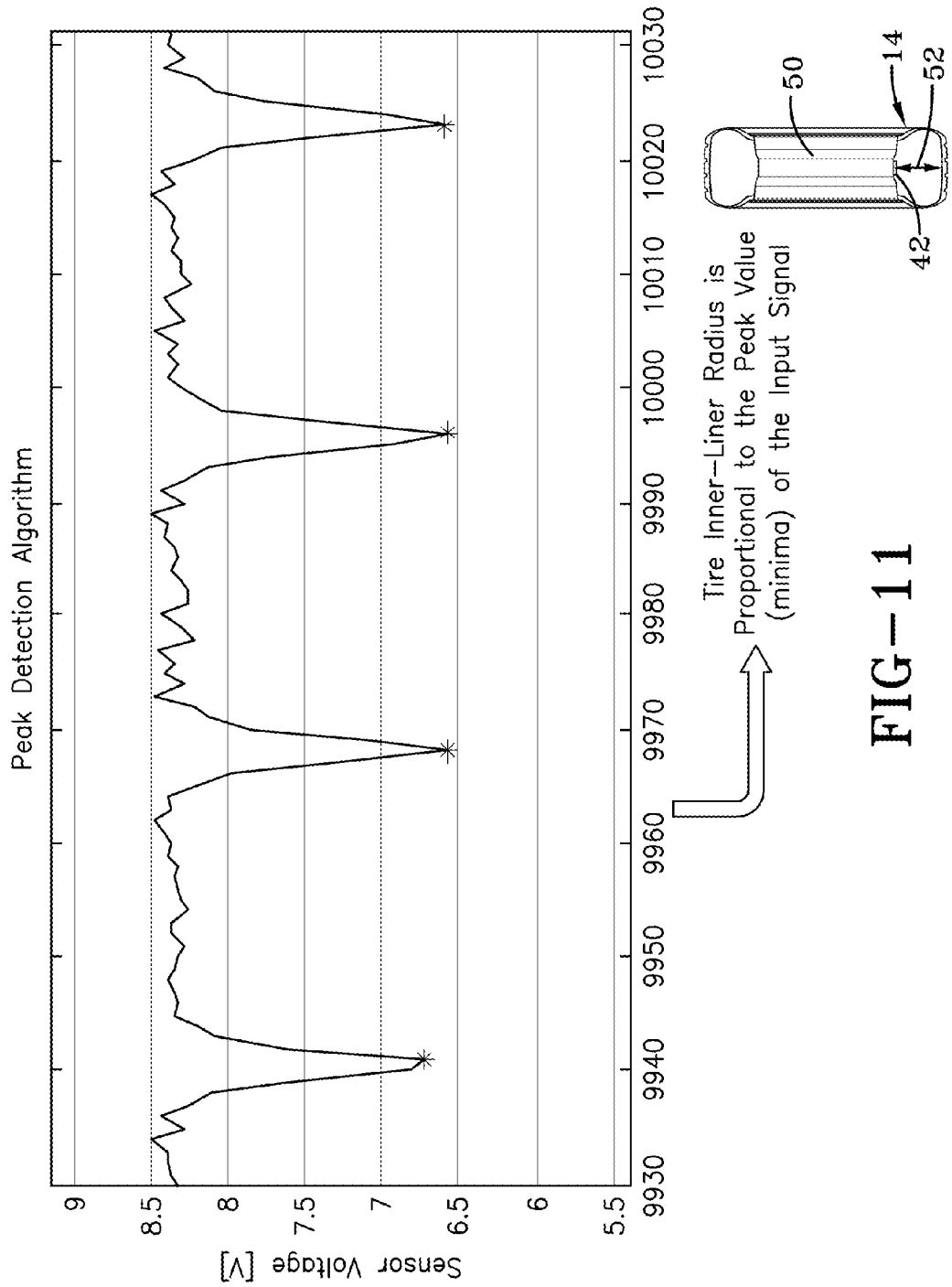
FIG. 11 is a graph of peak detection algorithm showing the inner liner radius to be proportional to the peak value of the input signal.

An enlarged raw signal profile is shown in the schematic and graph of FIG. 9. Sensor data for two rotations of the tire are shown in the graph plotting sensor voltage (V) against time. The leading and trailing edges of the two signals are shown and the footprint center identified for both rotations. In FIG. 10, the raw signal profile is graphed against Azimuth (degrees) and inner liner displacement as a function of rotation angle is identified. It will be seen that the inner liner displacement measurement is made at 180 degrees. FIG. 11 graphs sensor voltage (V) against inner liner radius detected to demonstrate the peak detection algorithm. The input signal from the laser sensor 42 mounted to rim 50 measures the inner liner radius 52 that is proportional to the Peak Value (minima) of the input signal.

Figure 12:
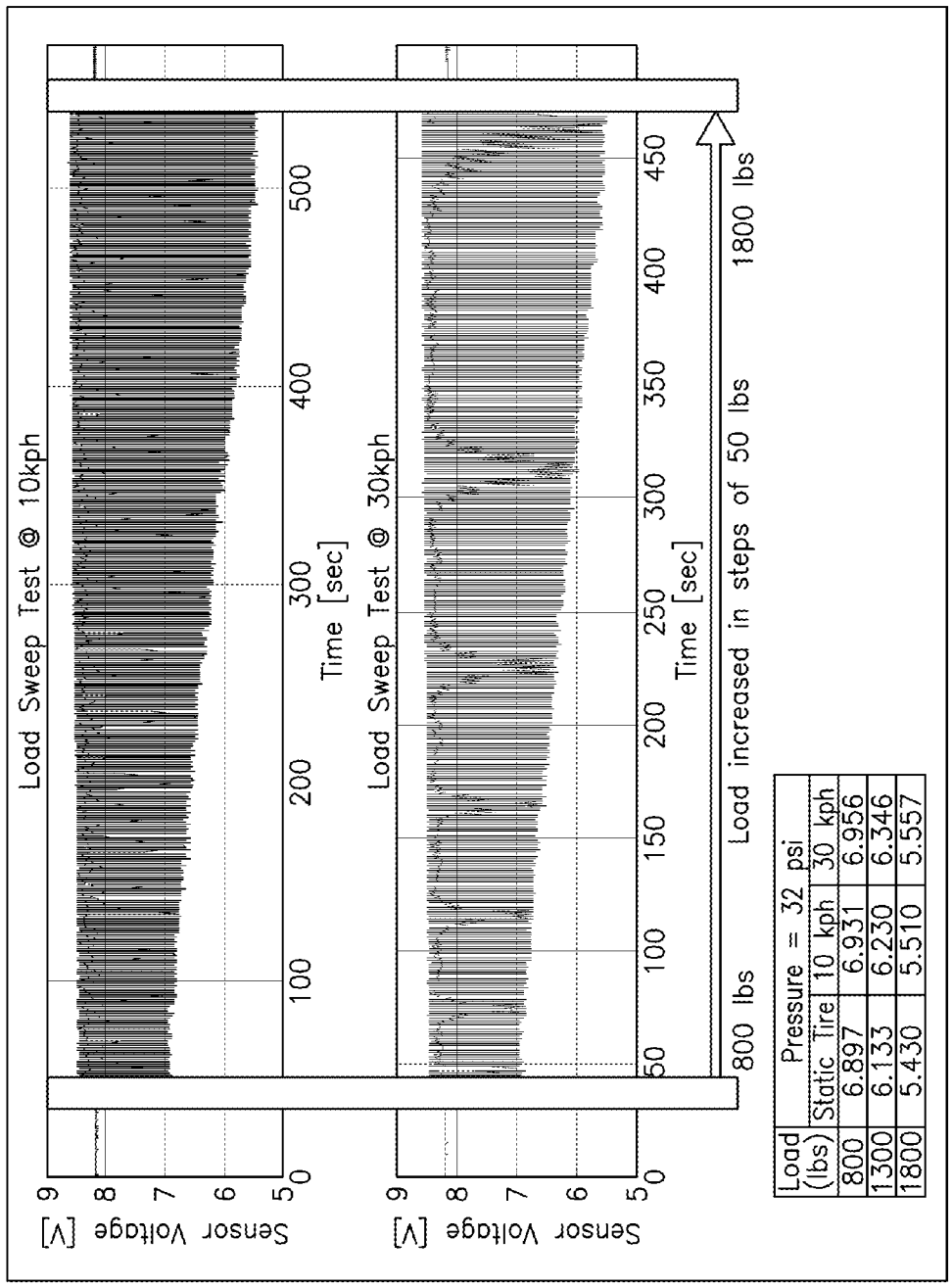
FIG. 12 is a load sweep test graph showing speed dependency in an inner liner radius measurement based load estimation system.
Figure 13:
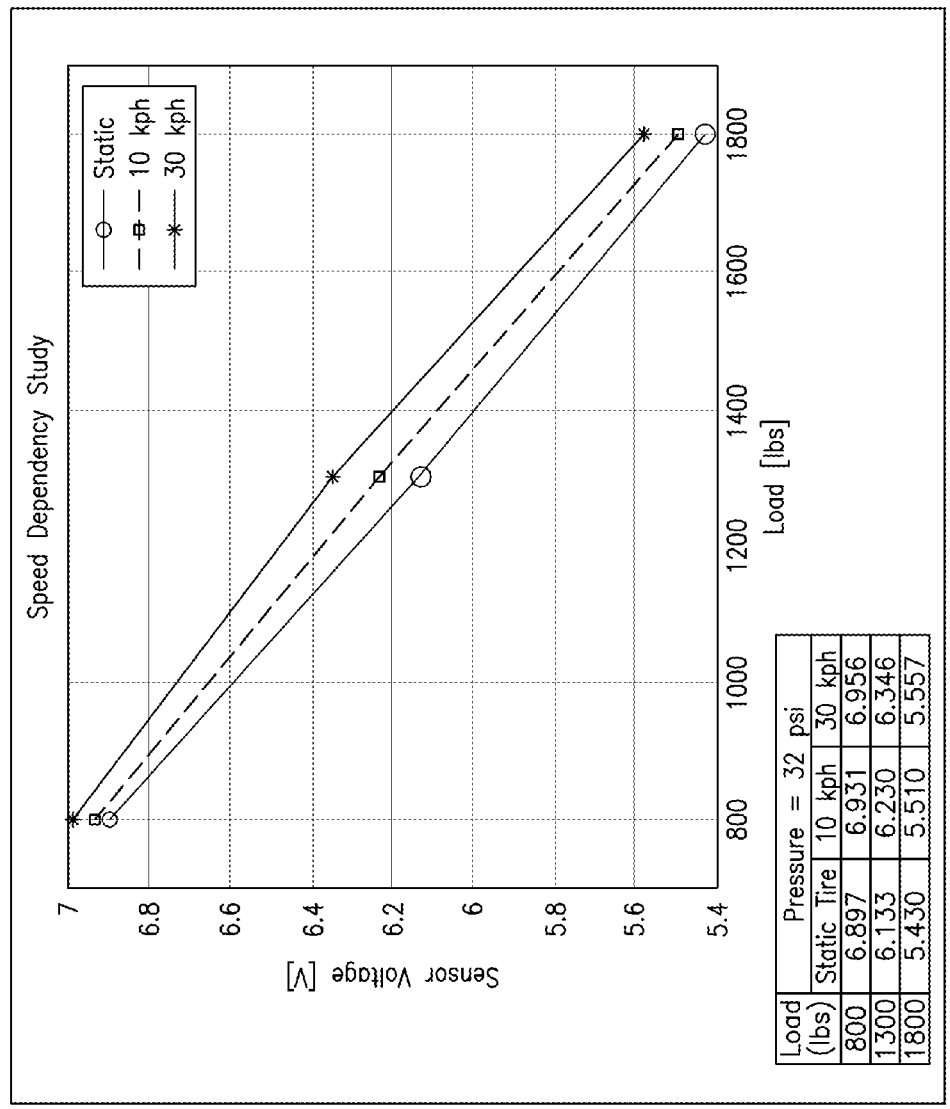
FIG. 13 is a load sweep test graph showing speed dependency at different tire loadings.

A load sweep test at vehicle speeds of 10 kph and 30 kph is graphically depicted in FIG. 12 with the load increments in steps of 50 pounds. At a tire pressure of 32 psi, the tabulated results are shown in FIG. 12 and summarized graphically in FIG. 13. FIG. 13 shows speed dependency in the load estimation between static condition and vehicle speeds of 10 and 30 kph. As shown, the change in load estimation is 0.05 V/10 kph. Accordingly, an input of vehicle speed is desired in order to compensate for the dependency shown. The Model captures pressure, load and speed dependency effects as inputs 28 shown in FIG. 26.

Model Fit: Sensor Voltage−(Correction Factor*Vehicle speed)=$p00+p10$*pressure+ $p01$*load+$p20$*pressure^2+$p11$*pressure*load Where: Correction Factor=0.05 V/10 kph.

A Recursive Least Squares (RLS) Estimation Algorithm (with forgetting factor) is used to achieve a Real-time load estimation. The RLS algorithm provides a method to iteratively update the unknown parameter at each sampling time to minimize the sum of the squares of the modeling error using the past data contained within the regression vector.

The Model capturing the pressure, load, and speed dependency effects may be stated as follows:

Sensor Voltage−(Correction Factor*Vehicle speed) =$p00+p10$*pressure+$p01$*load+$p20$*pressure^2+ $p11$*pressure*load The above equation can be rewritten into a standard parameter identification form as follows:

$y(t)$=(Sensor Voltage−(Correction Factor*Vehicle speed)−$p00-p10$*pressure−$p20$*pressure^2)/ ($p01+p11$*pressure)

$\Phi(t)$=1

$\theta(t)$=Tire load (the unknown parameter)

The tire load estimation system and method utilizes the above RLS algorithm as described previously in reference to FIG. 26.

Figure 14:
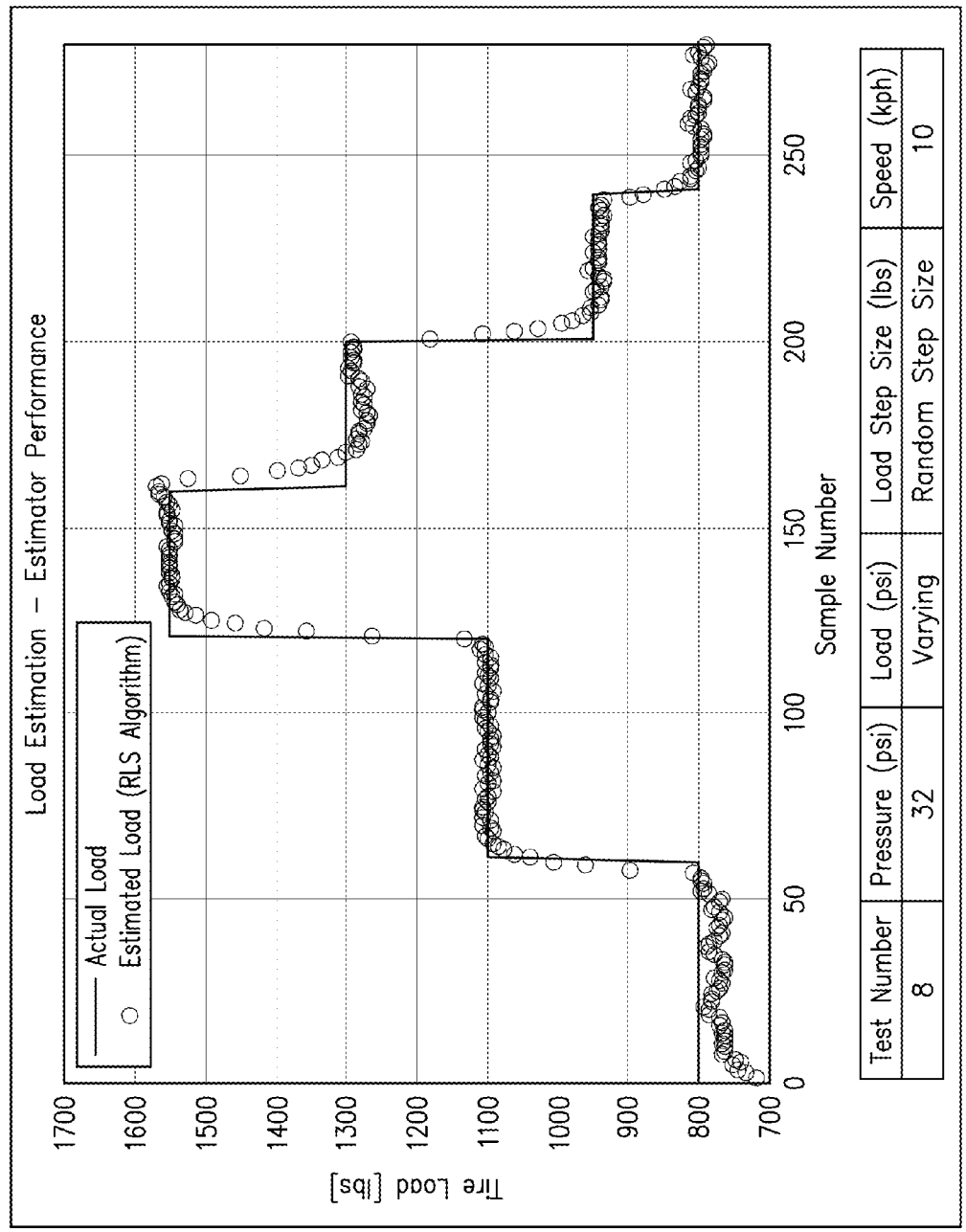
FIG. 14 is a graph showing the performance of the RLS estimation algorithm comparing actual load with estimated in an inner liner radius measurement based load estimation system.

With reference to FIG. 14, the performance of the RLS Estimation Algorithm is depicted graphically plotting actual load and estimated load using the algorithm. The load was changed dynamically in the test in 300 to 400 pounds step size. As seen by the close tracking or actual vs. estimated, the estimate was found to be within the desired range of accuracy (+/−50 pounds). Tire pressure for the test was set at 32 psi.

Figure 15:
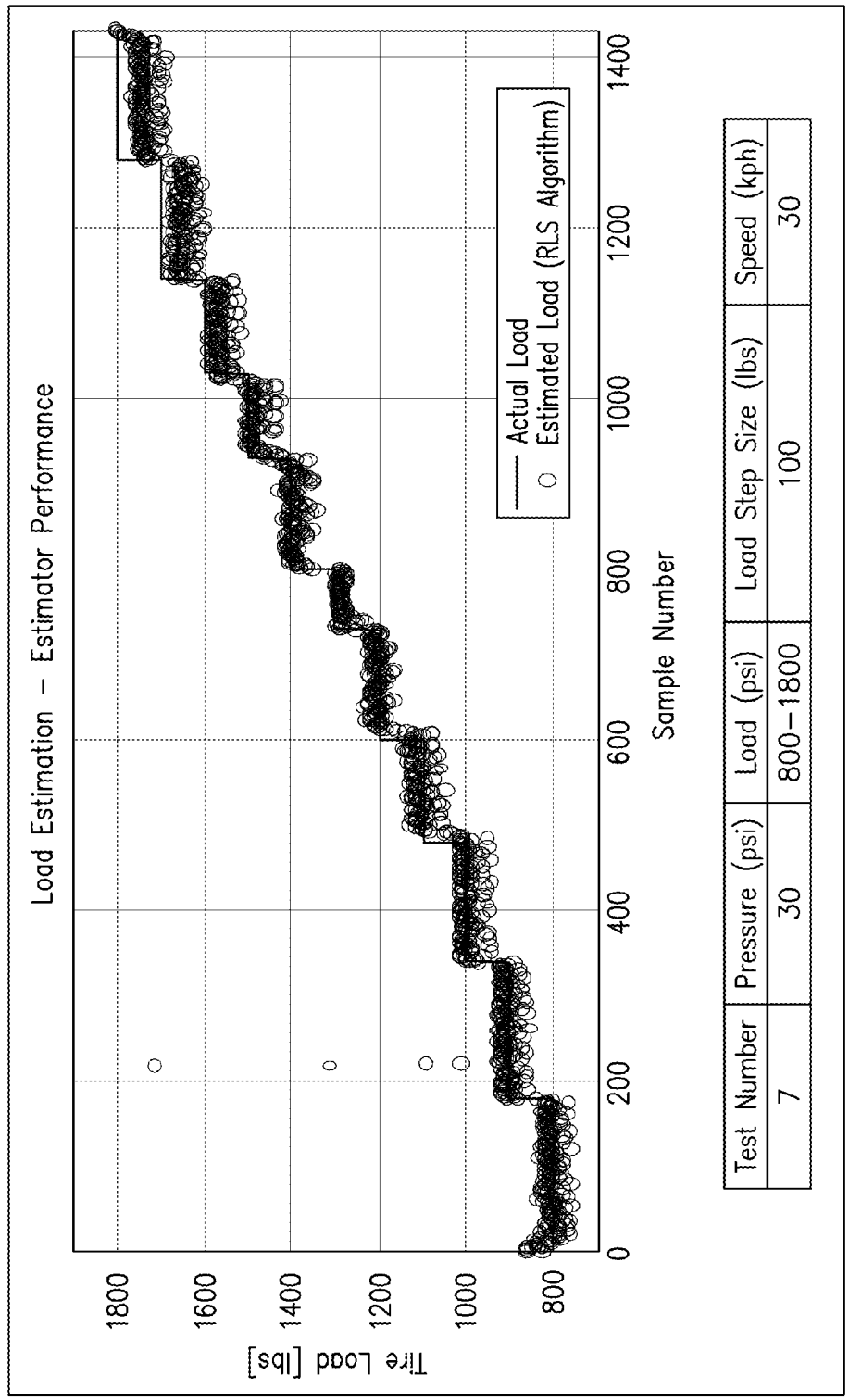
FIG. 15 is a load sweep test graph showing actual vs. estimated load at 100 lbs. steps.
Figure 16B:
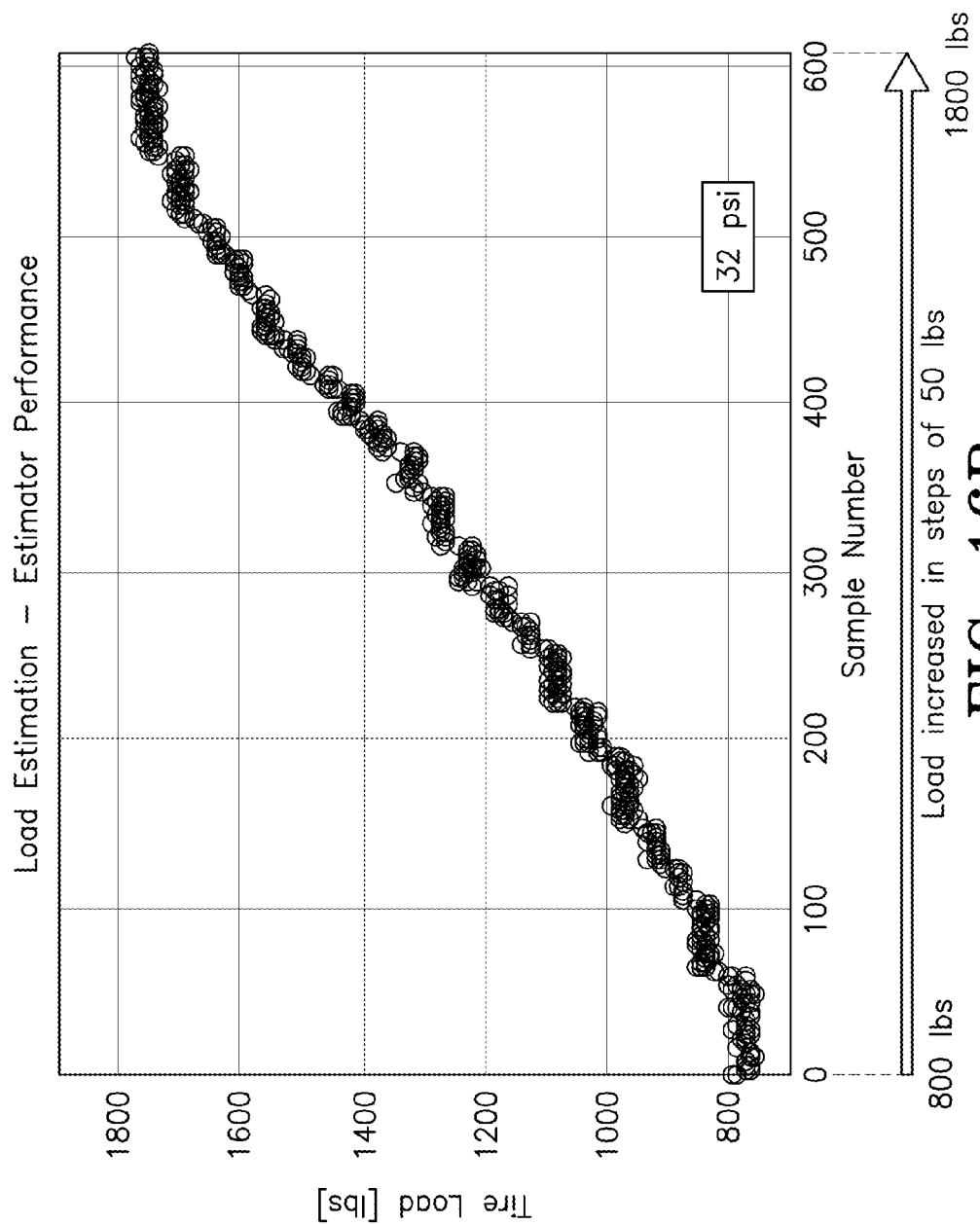
FIG. 16B is a load sweep test result graph showing estimator performance at a 32 psi inflation.
Figure 17:
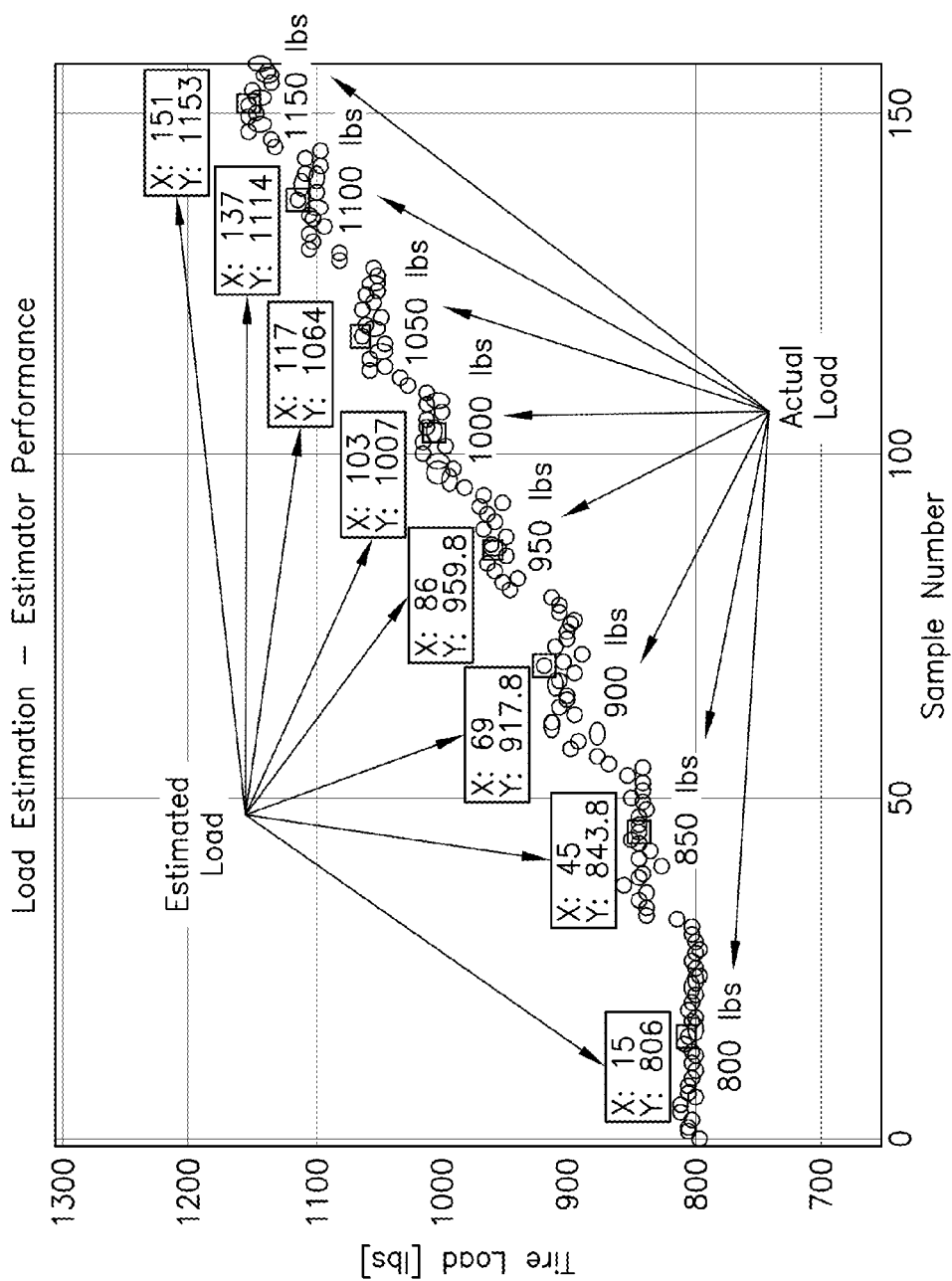
FIG. 17 is a graph of estimator performance showing estimated load vs. actual load summary results.
Figure 18:
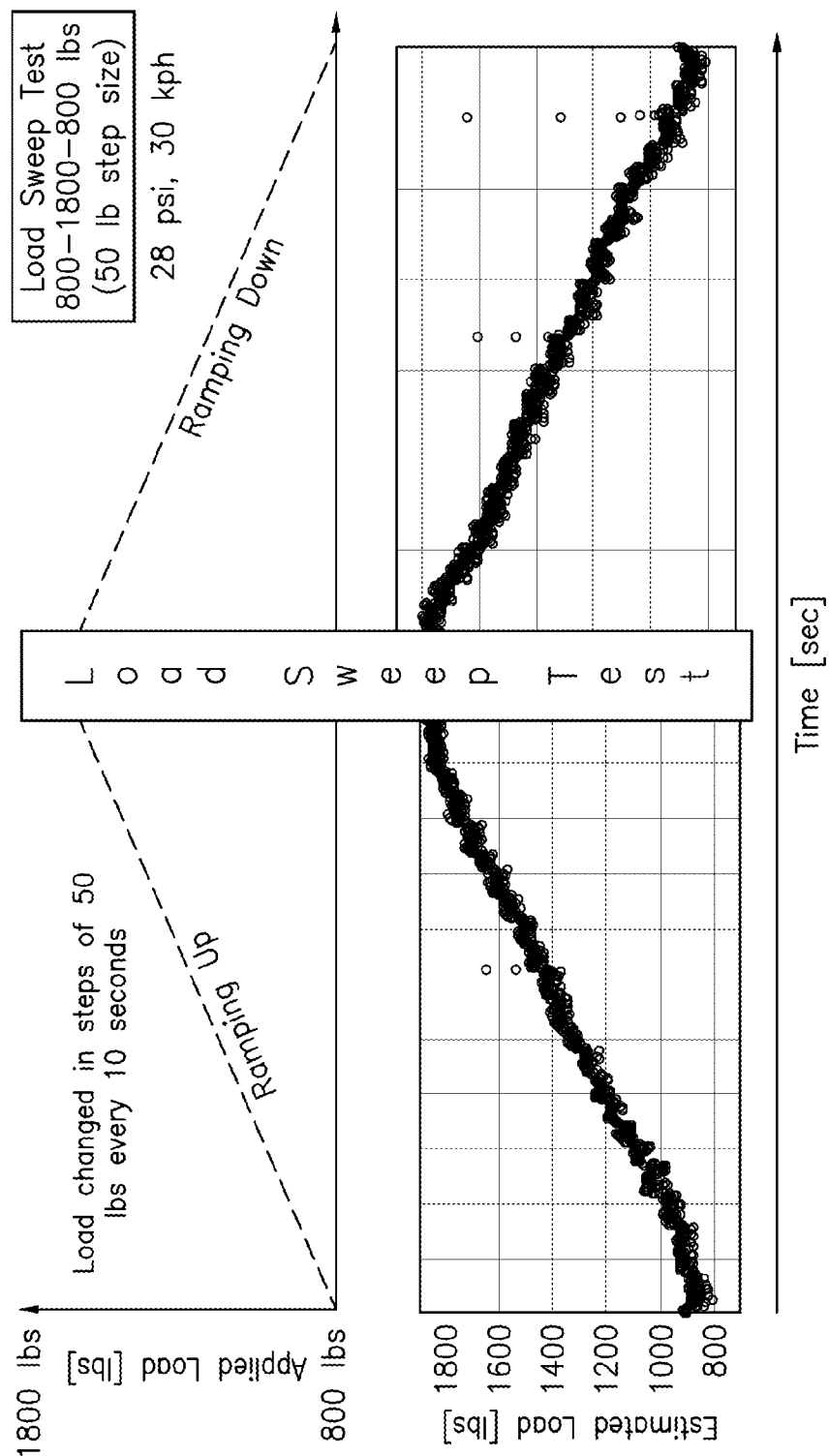
FIG. 18 is a load sweep test results graph for 50 lbs. step size increments.

FIG. 15 shows yet another load sweep test result plotting both actual and estimated load through iterative samples. The step size for the test shown was 100 pounds at a speed of 30 kph and a tire inflation of 30 psi. The estimates are seen to satisfactorily track actual within the desired range of accuracy. FIGS. 16A through 16C show estimator performance (actual vs. estimated) for different tire inflation pressures of 28, 32 and 36 psi at incremental loading steps of 50 pounds between 800 and 1800 pounds. Good estimation accuracy is evident. FIG. 17 is an enlarged portion of the graph of FIG. 16A showing the tracking between estimated and actual load in greater detail and, again, verifying the RLS estimation algorithm predictive validity. FIG. 18 shows another test result graphically in which the tire loading is ramped up and down every 10 seconds in 50 pound steps between 800 and 1800 pounds. The graphs show an acceptable predictive accuracy in both the ramp-up and ramp-down sequences.

Figure 19B:
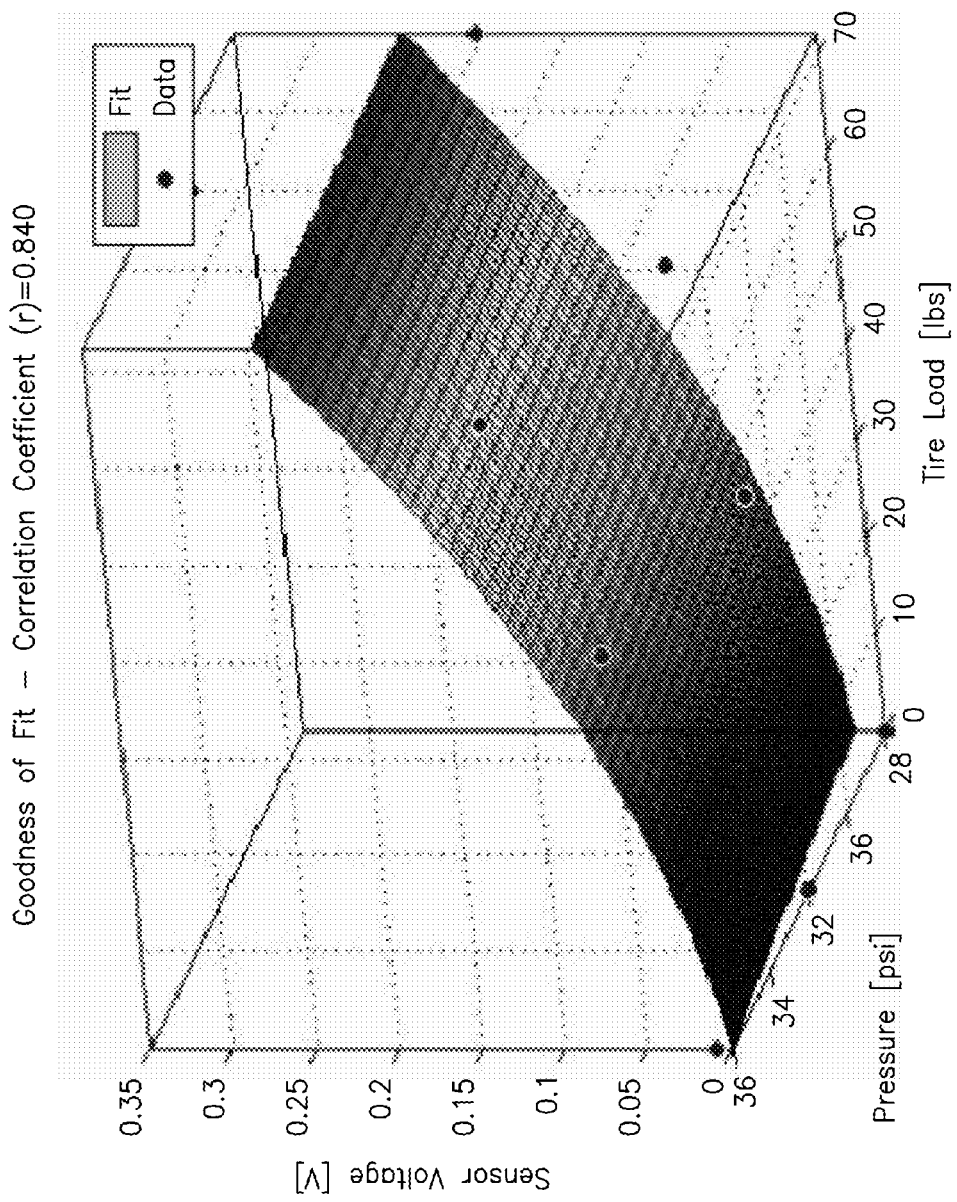
FIG. 19B is a graph showing goodness of fit after a speed correction application.

In FIG. 19A the dependency of sensor output to vehicle speed is shown for inflation pressures of 28, 32 and 36 psi. In order to enhance model fit, a model correction is desired to capture speed dependency. The following expression applies:

Sensor Voltage−(Speed Correction Factor)=$p00+$ $p10$*pressure+$p01$*load+$p20$*pressure^2+ $p11$*pressure*load FIG. 19B shows goodness of fit for a correlation coefficient of (r)=0.840. The speed correction factor is defined as follows:

Speed correction factor=fitresult.$p00$+fitresult.$p10$.*$x$+ fitresult.$p01$.*$y$+fitresult.$p20$*$x$.^2+ fitresult.$p11$.*$x$.*$y$ Where x=speed and y=tire pressure.

Figure 20A:
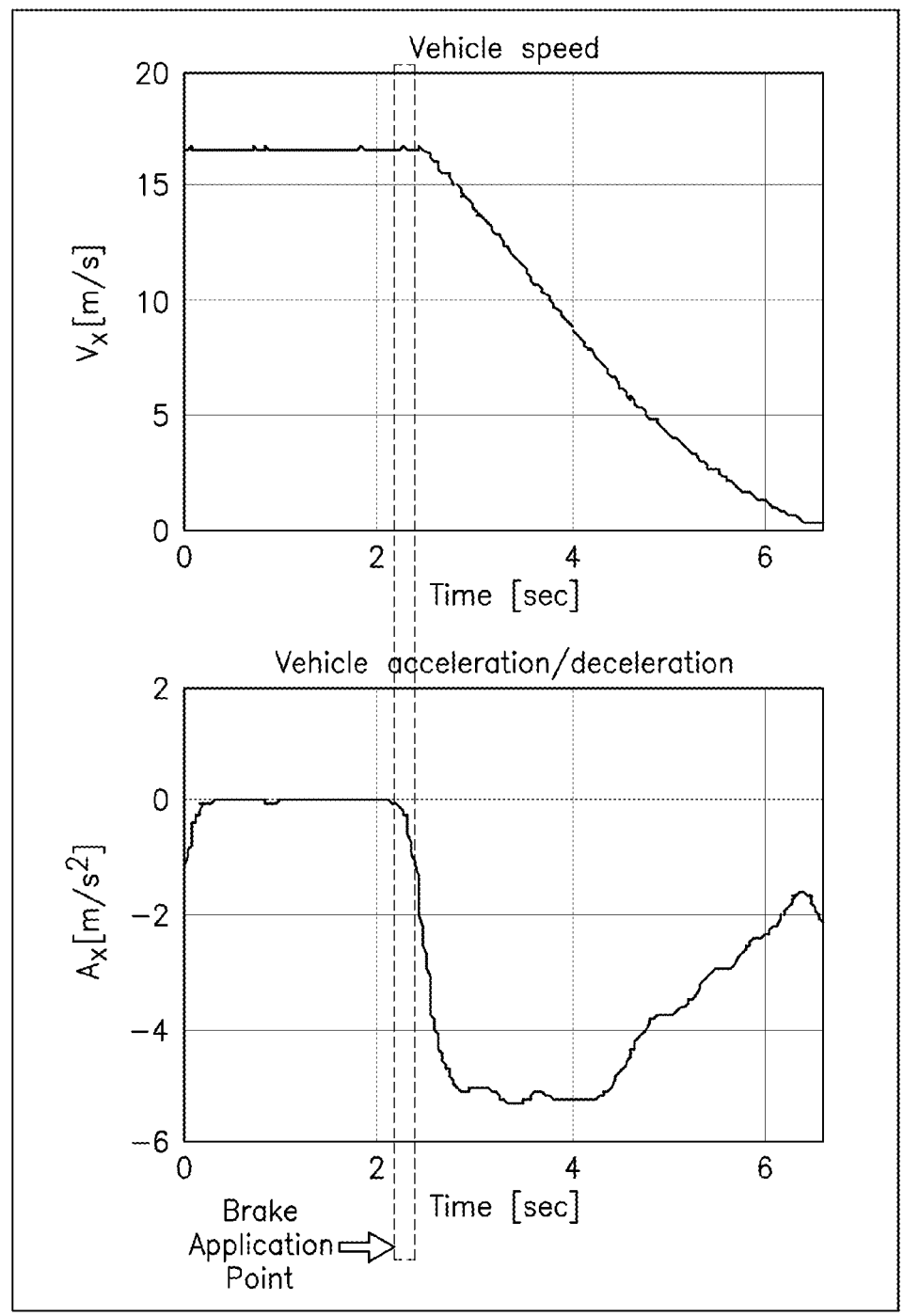
FIG. 20A are graphs of vehicle speed and acceleration over time in a high speed braking test.
Figure 20B:
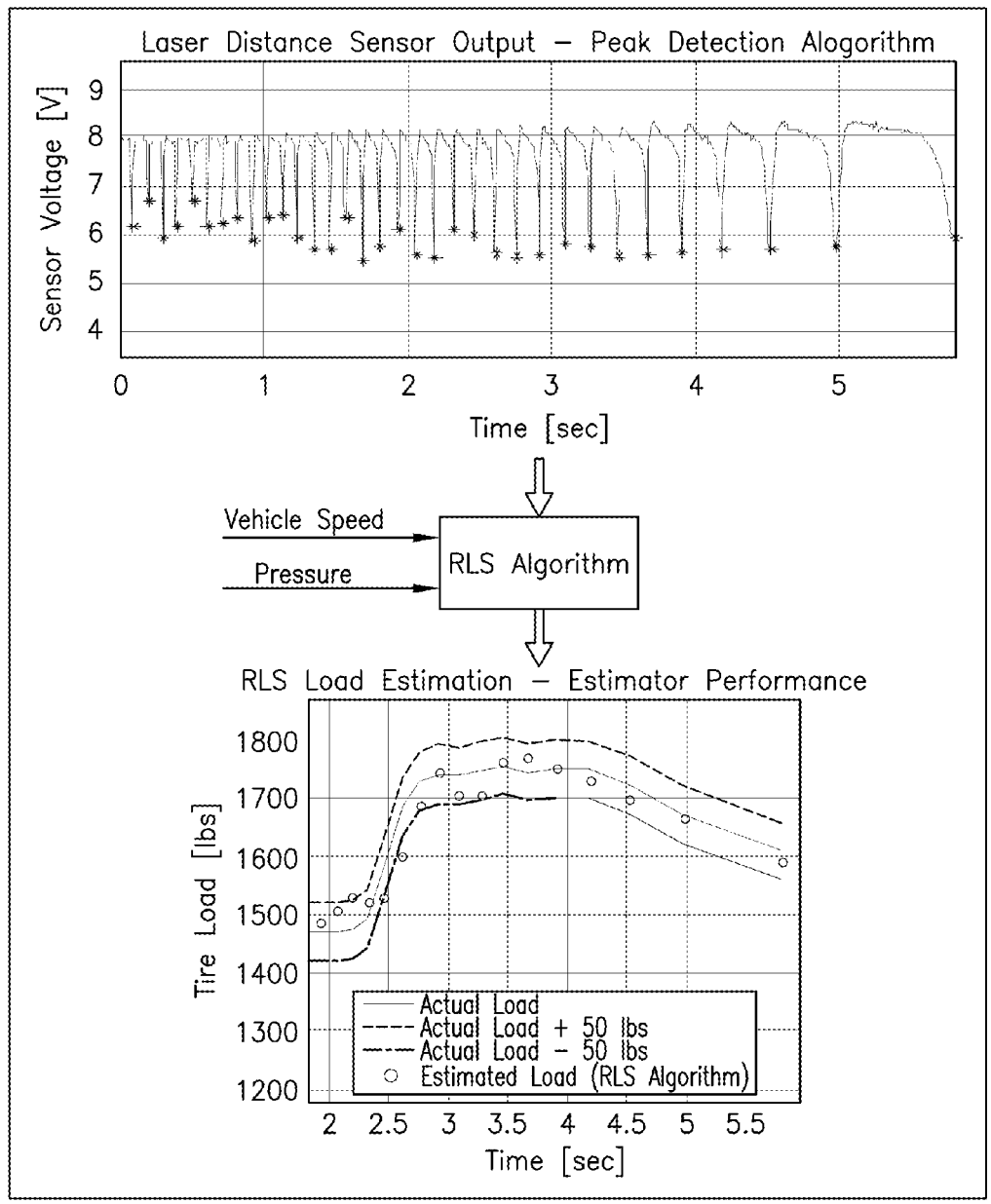
FIG. 20B is a graph of RLS estimation estimator performance results.

In FIG. 20A, the test result graphs showing a high speed braking test on regular asphalt are shown at a tire inflation pressure of 32 psi. The vehicle speed is reduced from 100 to 0 kph with resultant acceleration reduction is shown. In FIG. 20B, the laser radius distance sensor output Peak Detection Algorithm and resultant RLS Load Estimation Estimator Performance graphs are presented. As evidenced by the close correlation between actual load, actual load +/−50 pounds and estimated load (RLS Algorithm), estimation is achieved to the desired accuracy level.

Figure 21A:
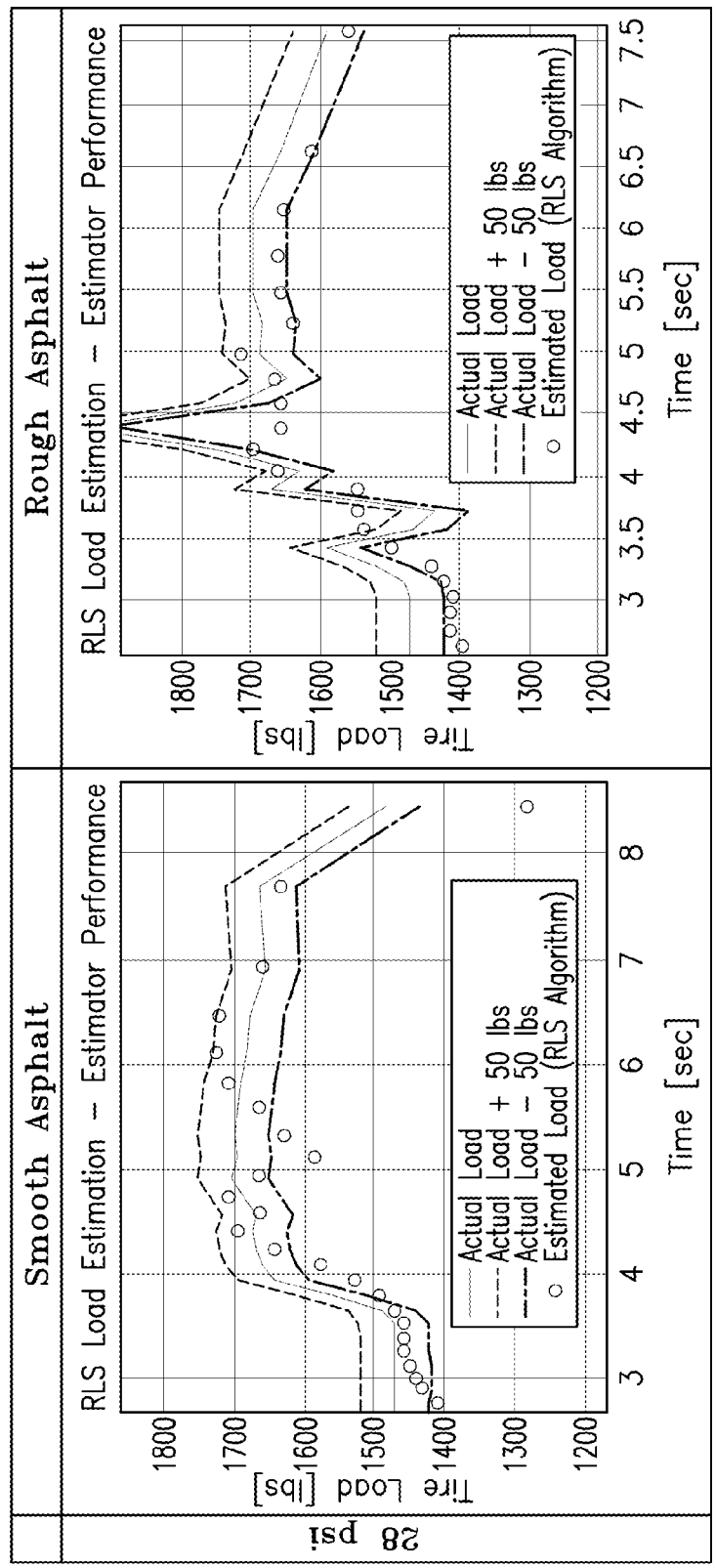
FIG. 21A are graphs of a high speed braking test on smooth and rough asphalt at 28 psi inflation.
Figure 21B:
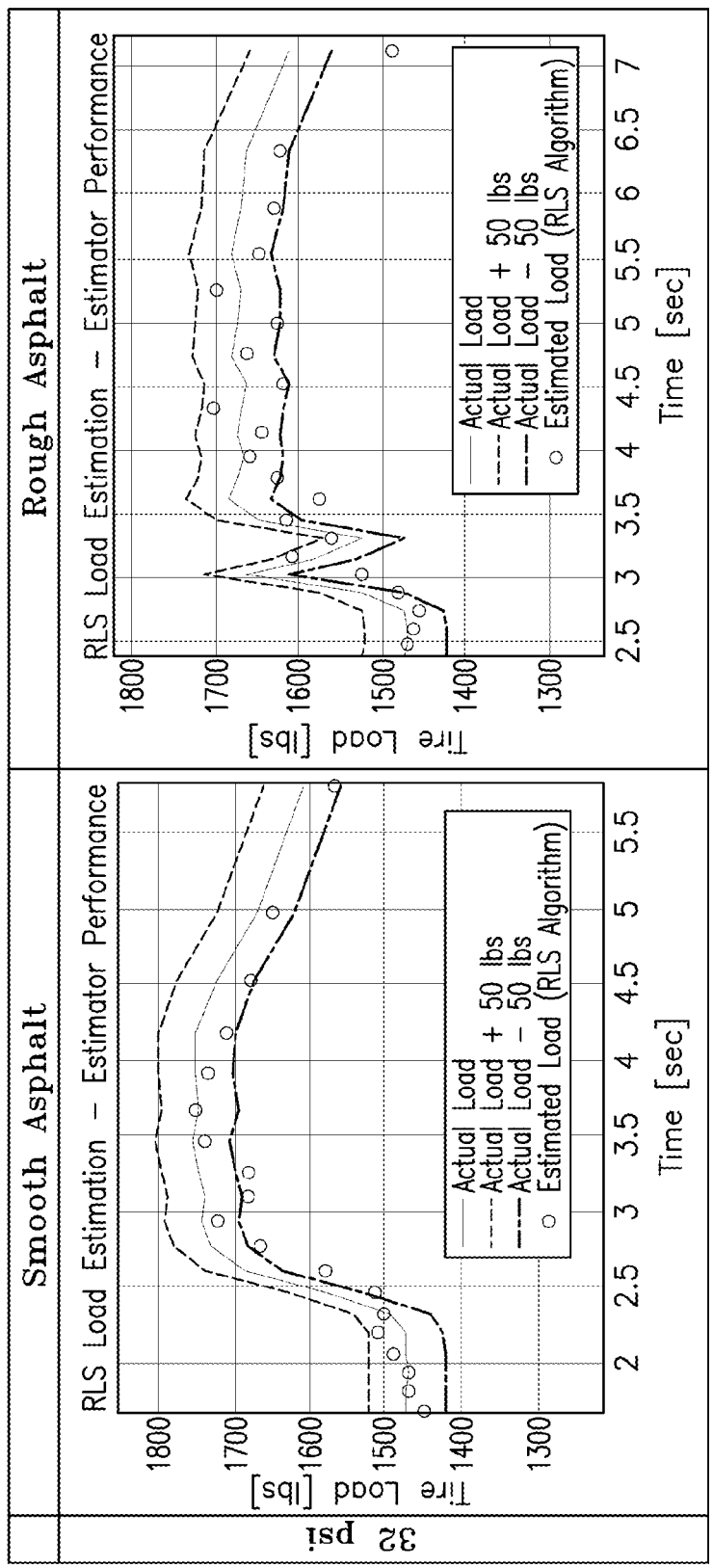
FIG. 21B are graphs of a high speed braking test on smooth and rough asphalt at 32 psi inflation.
Figure 21C:
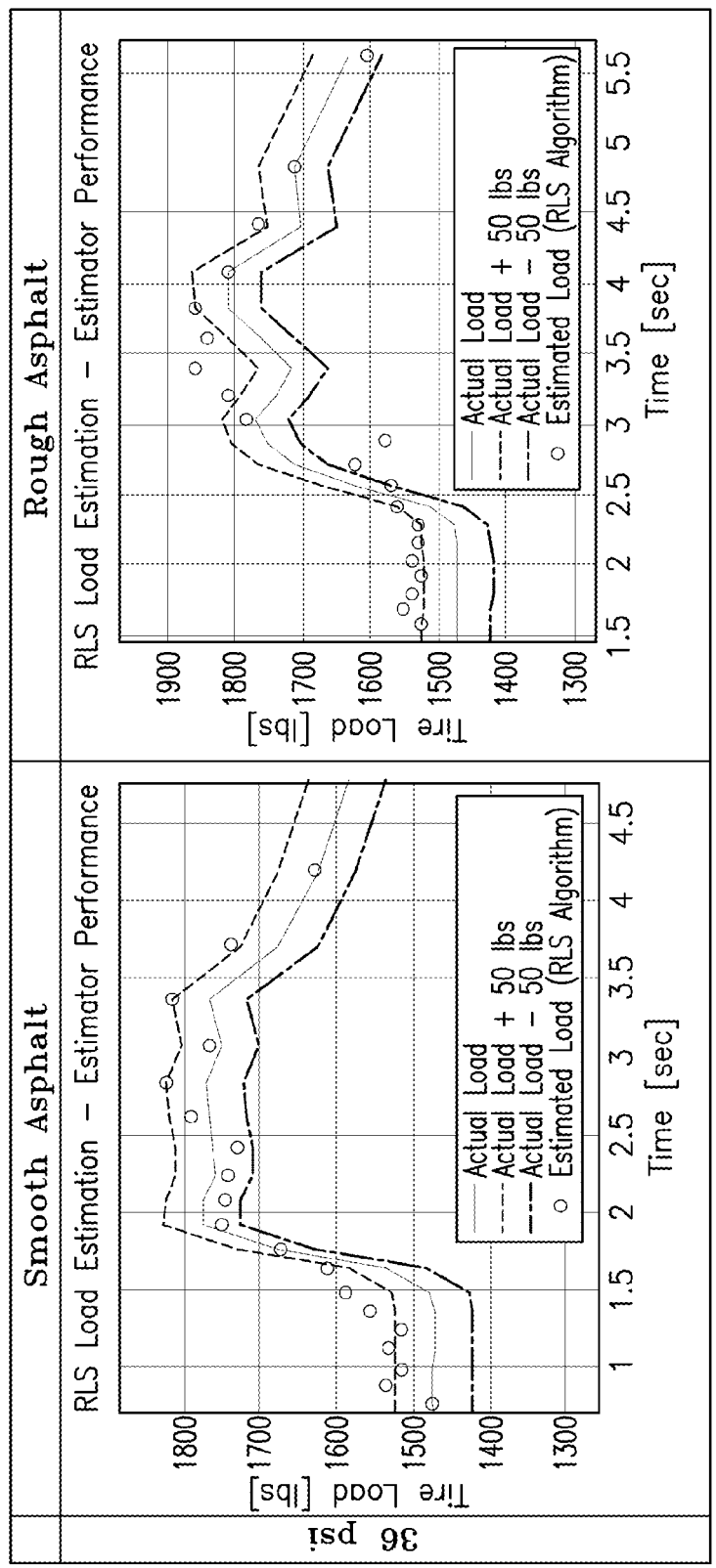
FIG. 21C are graphs of a high speed braking test on smooth and rough asphalt at 36 psi inflation.

FIGS. 21A through 21C, further high speed braking (100 to 0 kph) test results are graphically depicted and the effect of surface differentiation on the efficacy of the RLS Load Estimation is seen. The estimation results of the RLS Algorithm are compared against actual loading on a tire inflated to 28, 32 and 36 psi for both smooth and rough asphalt road conditions. The testing verifies that the RLS algorithm exhibits satisfactory performance even under high speed braking conditions on both smooth and rough asphalt with just one radius measurement per tire rotation (single point sensor).

Figure 22A:
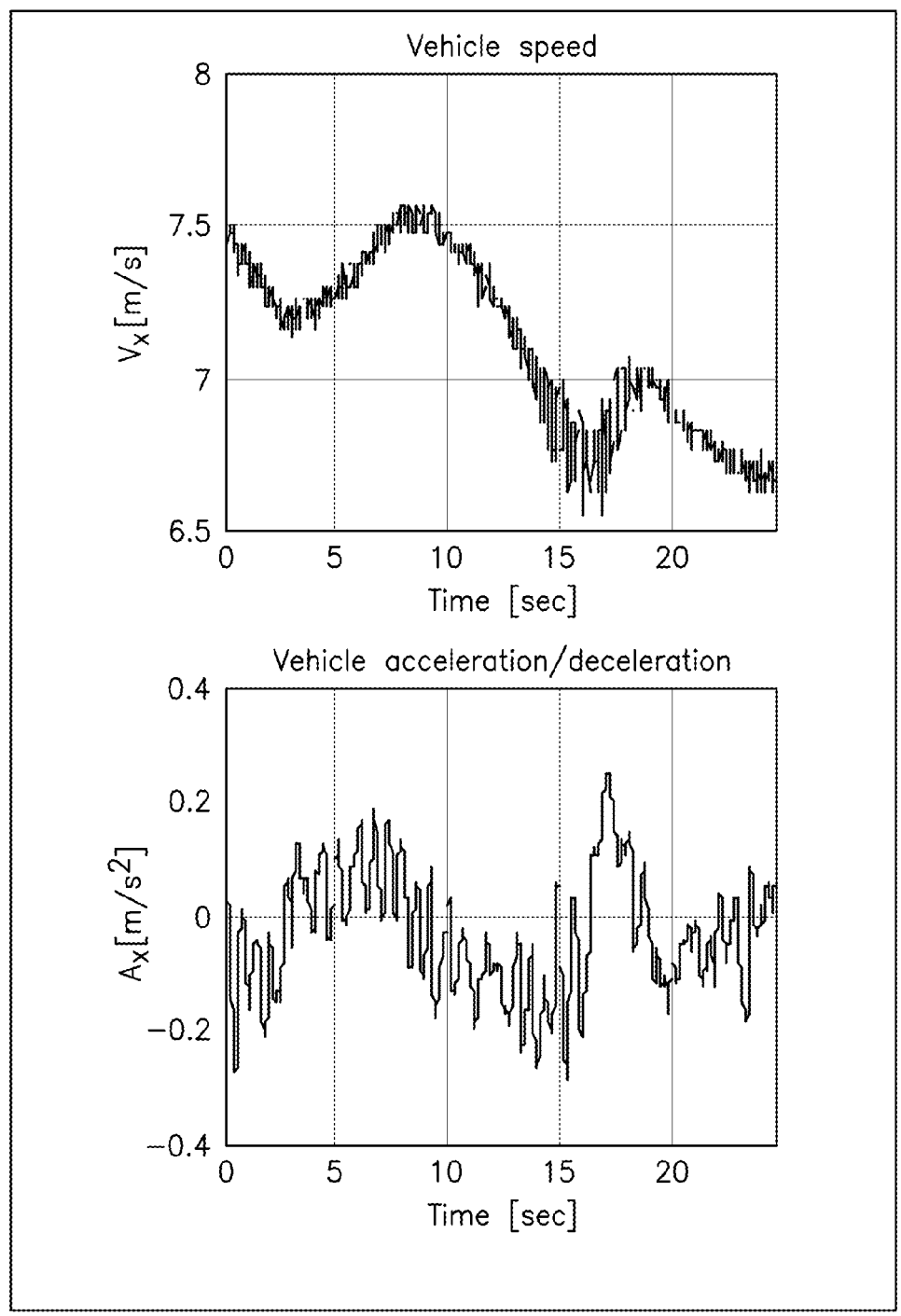
FIG. 22A are vehicle speed and acceleration graphs in a constant speed test.
Figure 22B:
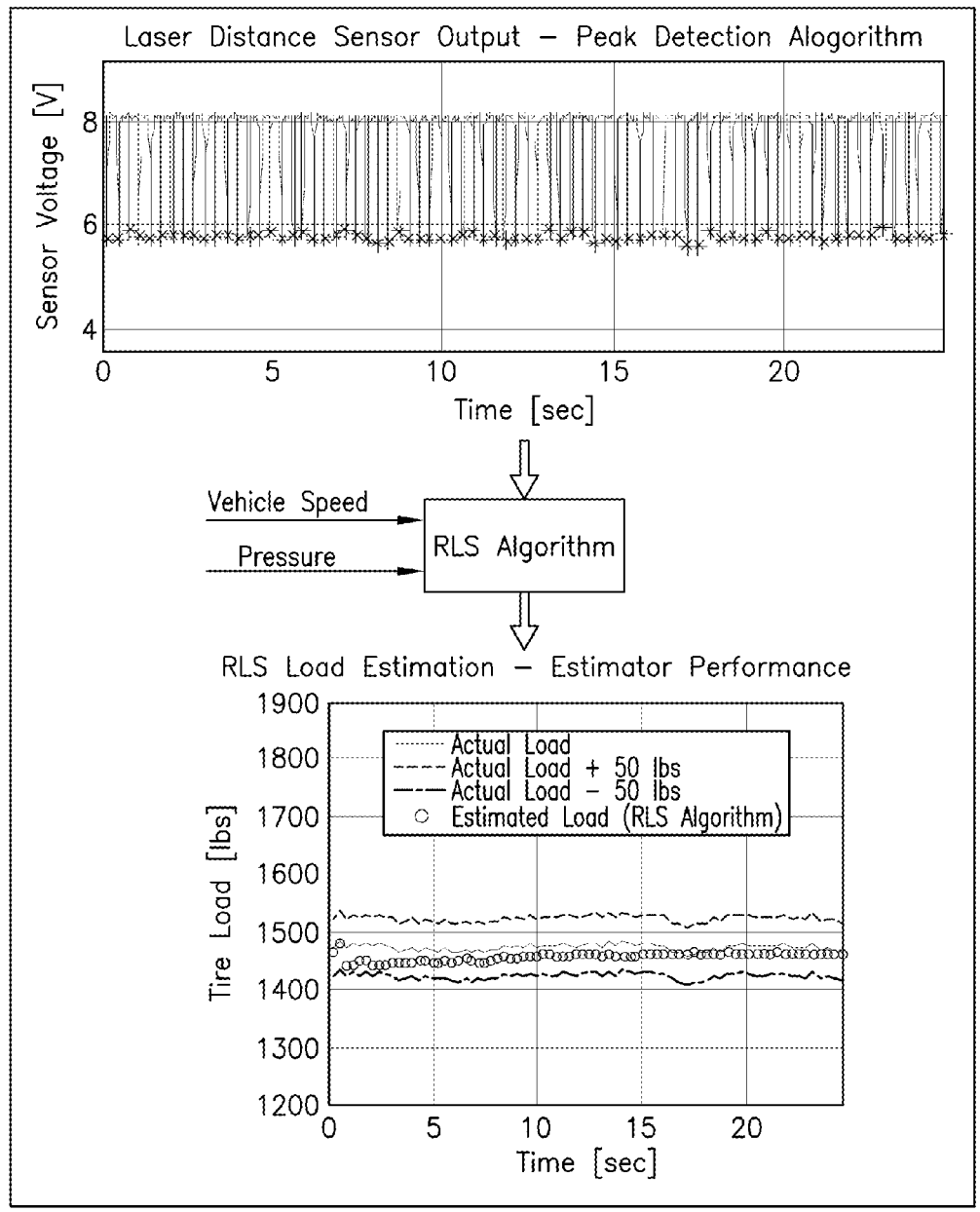
FIG. 22B are graphs of laser distance sensor output and RLS load estimation in the test.
Figure 23A:
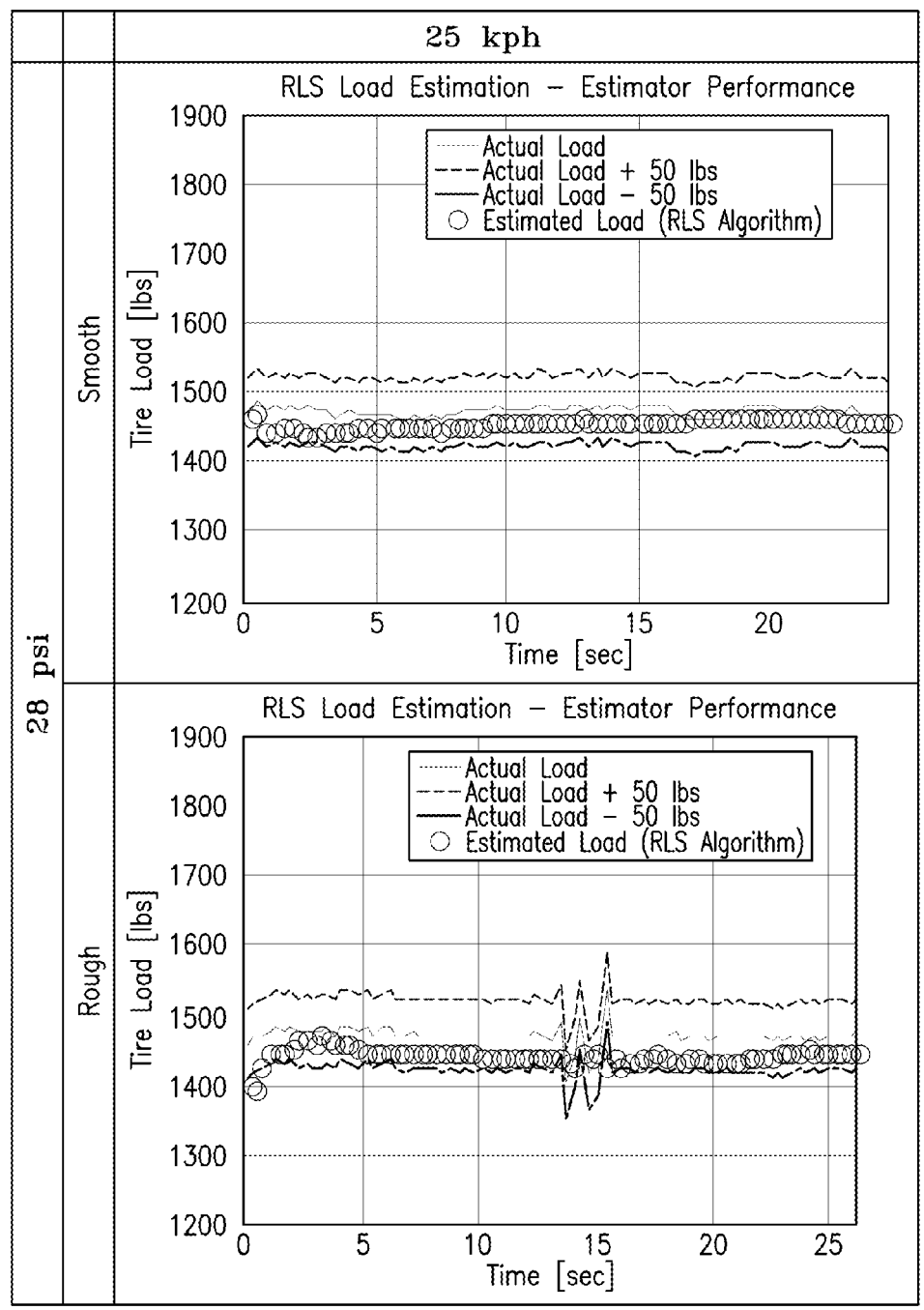
FIG. 23A are graphs of constant speed test results at 25 kph.
Figure 23B:
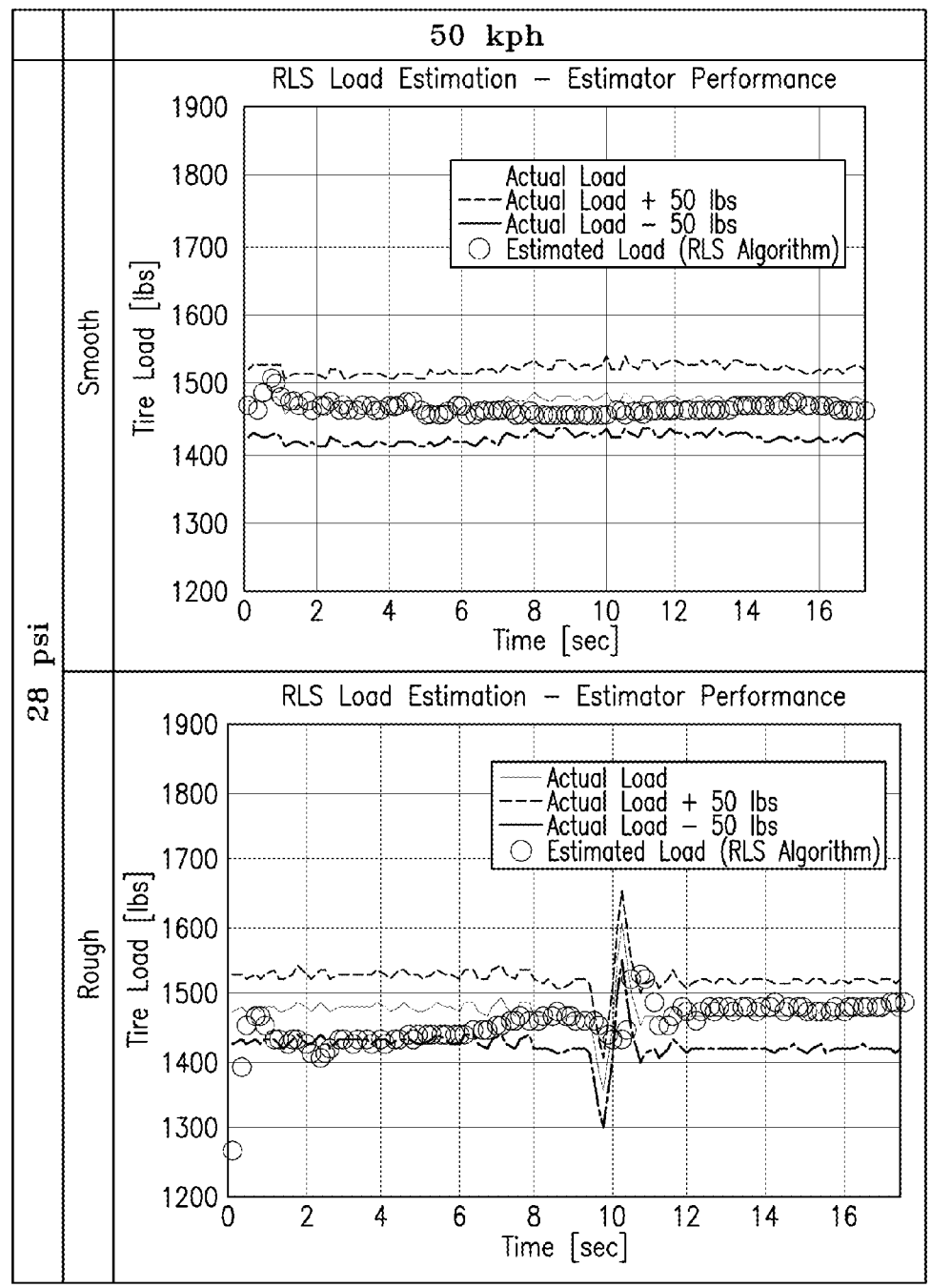
FIG. 23B are graphs of constant speed test results at 50 kph.
Figure 23C:
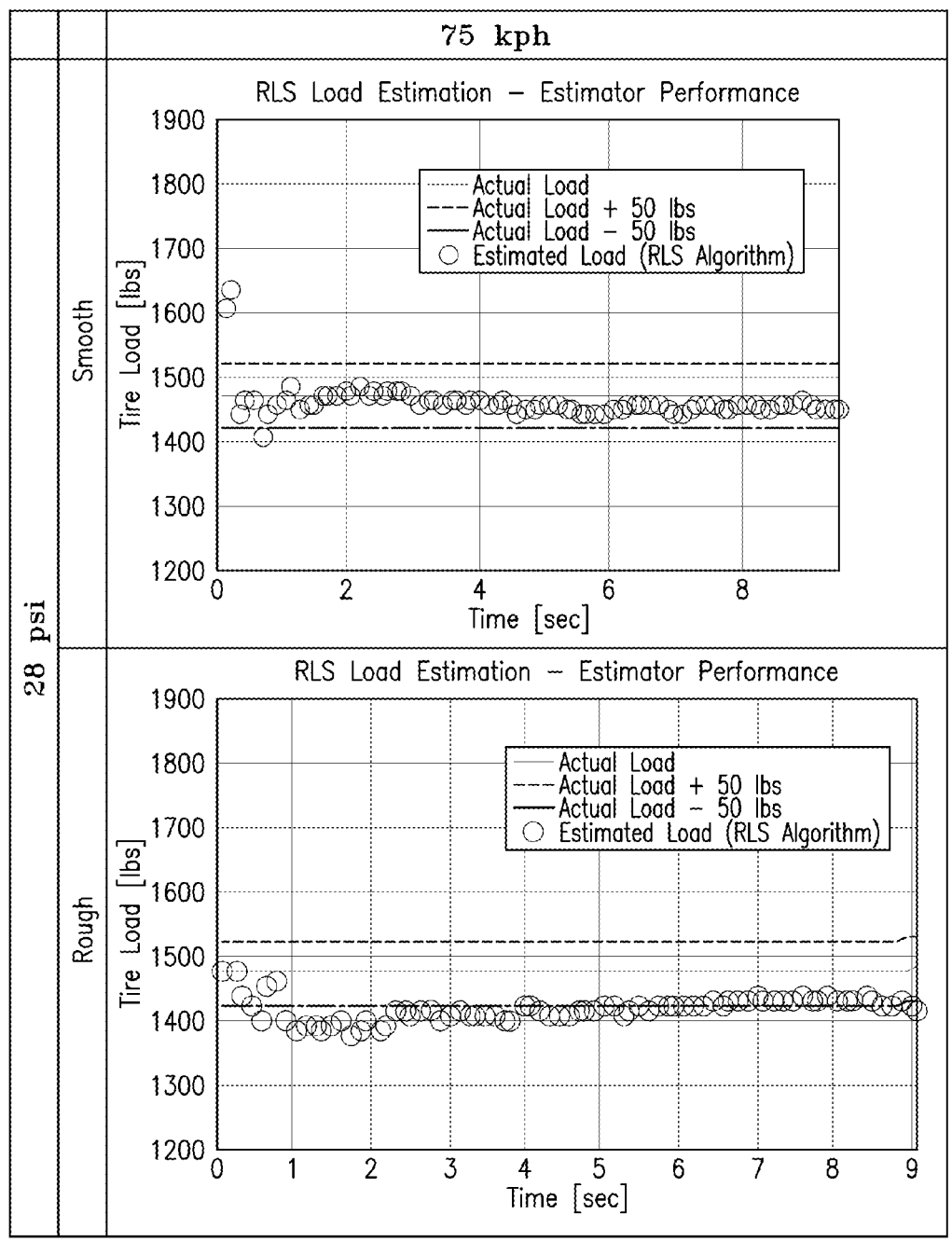
FIG. 23C are graphs of constant speed test results at 75 kph.

FIG. 22A shows vehicle speed and acceleration graphs for a vehicle inflated to 28 psi and travelling over regular asphalt. FIG. 22B shows the laser distance sensor voltage output and corresponding RLS Load Estimation Estimator Performance over time graphs. As demonstrated, the estimation is well within the desired accuracy level. FIGS. 23A through 23C show constant speed testing for a tire inflated to 28 psi for 25, 50 and 75 kph travelling speeds over rough and smooth asphalt. As demonstrated in the RLS Load Estimation-Estimator Performance graphs, the algorithm is capable of capturing dynamic load transfer events and is robust against external disturbances such as differentiated surface roughness or surface anomalies such as potholes.

Figure 24:
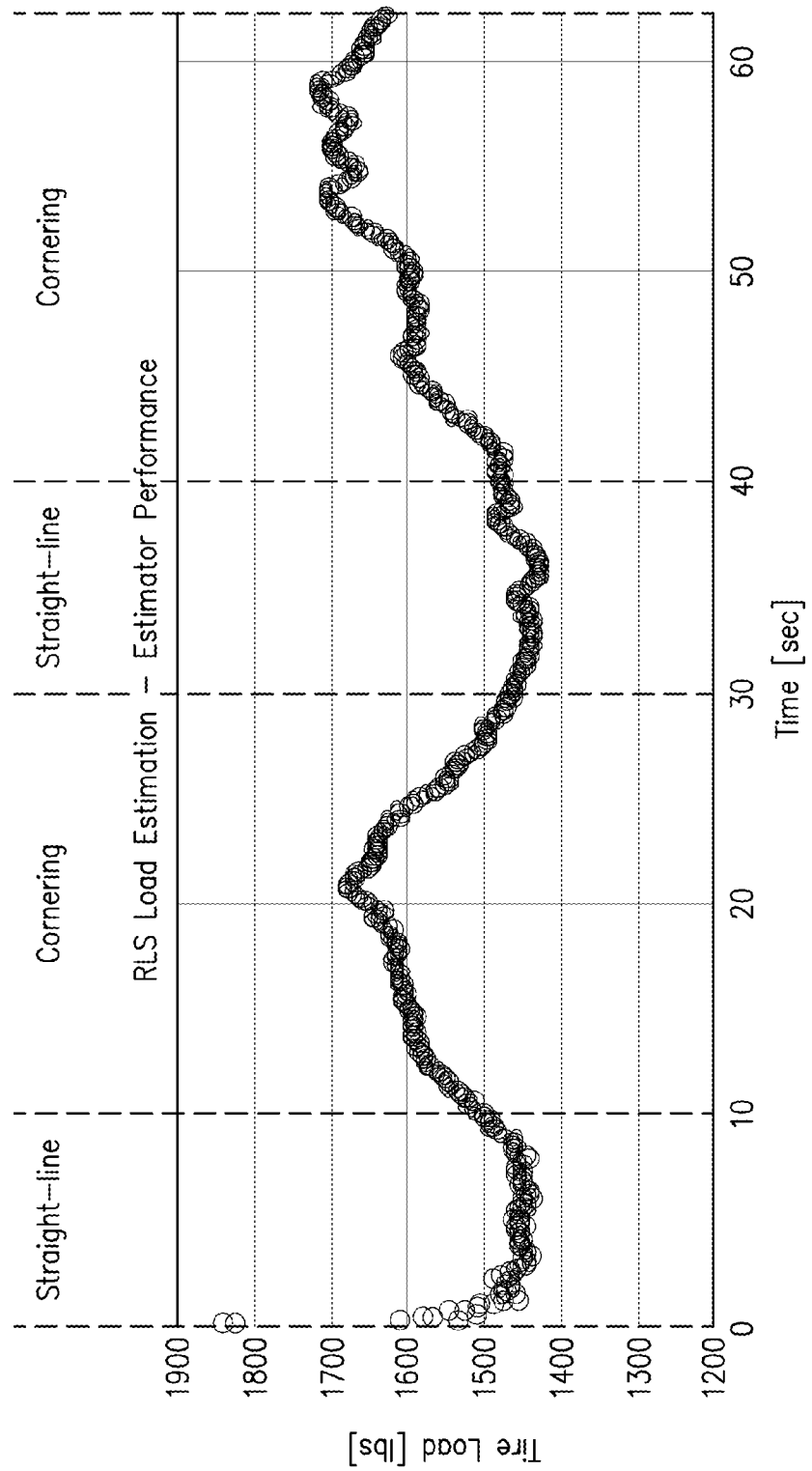
FIG. 24 is a graph showing tire load estimator results over a test track oval.
Figure 25A:
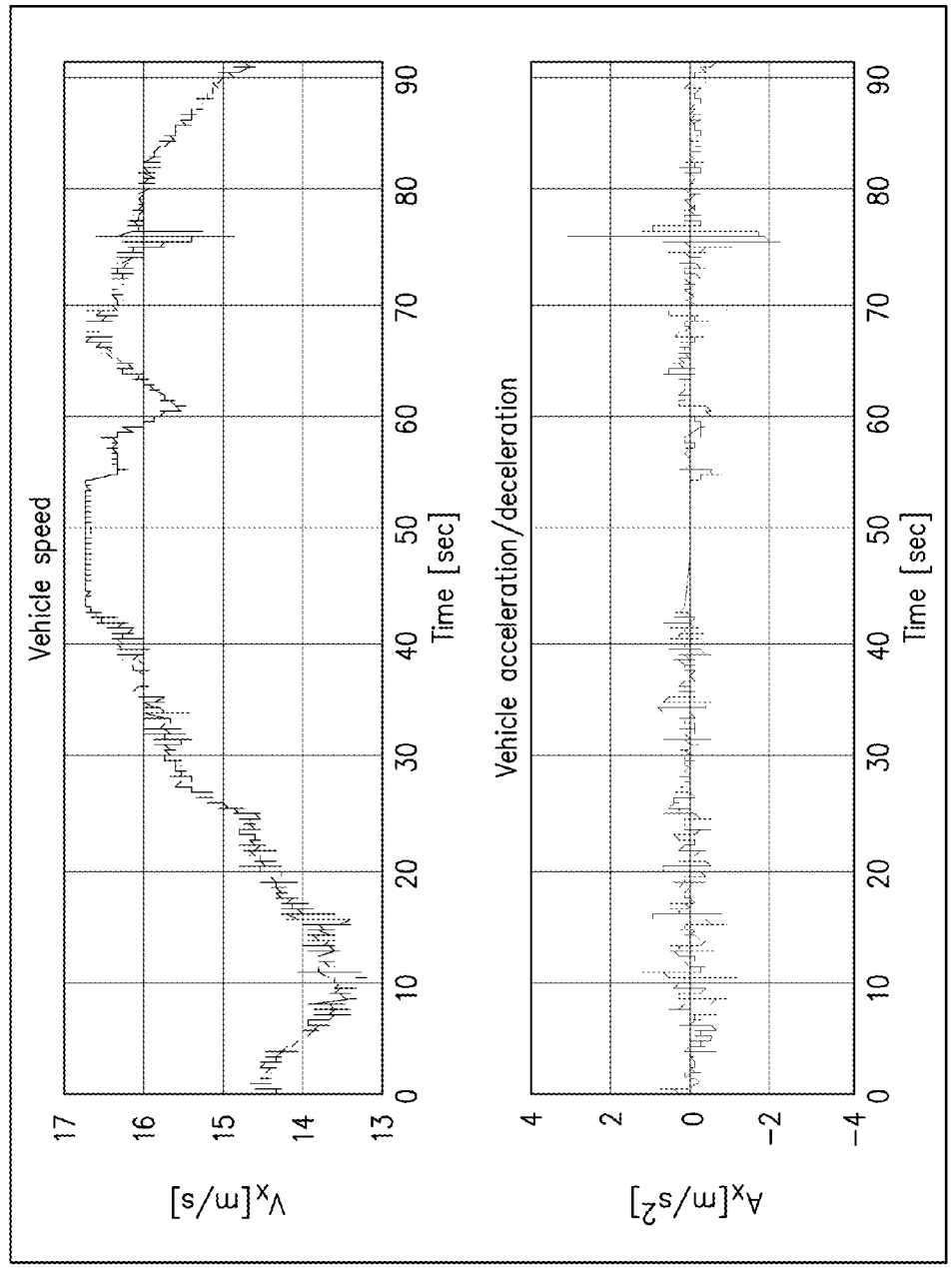
FIG. 25A are vehicle speed and acceleration graphs of an estimator test over public roads.

Further testing of the RLS Load Estimation Algorithm on the effect of straight line vs. cornering travel paths also validates the subject load estimation system and method. FIG. 24 shows tire load estimation made by the RLS Load Estimation Algorithm under an oval test track travel path at 90 kph. The straight line measurement of inner liner radius vs. cornering sensor output is reflected in the load estimation results and are within the desired range of estimation accuracy. In FIG. 25A, the vehicle velocity and acceleration graphs are shown in a test of the subject invention on roads at 55 kph. The RLS Load Estimation-Estimator Performance graphs of actual vs. estimated loads are shown in FIG. 25B and demonstrate that load estimated using the RLS Estimation Algorithm are within the desired accuracy band for vehicle use on typical road configuration.

From the foregoing, it will be appreciated that the subject inner liner deflection based estimation system and method utilizes an inner liner radius measuring sensor, such as a laser distance measuring sensor, for the purpose of measuring inner liner deflection. Use of a laser sensor or, alternatively, an eddy current sensor, or a magneto-inductive sensor, or a capacitive sensor provides significant durability advantage. Such sensors avoids the durability issues with a less robust sensor such as strain sensors. The laser distance measuring sensor may be incorporated directly into a TPMS module, whereby avoiding interconnection and attachment-to-tire related issues. Moreover, the subject system positions the inner liner radius measuring device radially opposite the crown center. The model is mathematically robust and accurate, using a robust linear model for load estimation. To the contrary, footprint length based models are non-linear and susceptible to road roughness related effects that introduce noise into the load measuring signal. The subject invention system and method is tire based, not vehicle based, making the load estimation simpler and more accurate. A vehicle based approach is more complex and typically requires a measurement of chassis height over ground. Such a measurement in vehicle-based systems are inherently more complex and must account for suspension bushing effects, road undulation effects, and other operational variables.

As seen in FIG. 26 and described above, the subject tire load estimation system and method for a vehicle may employ one or multiple tire pressure sensors mounted to a vehicle tire 14 for detecting a measured tire air cavity pressure; one or more vehicle speed sensors mounted to provide a measured vehicle speed; a tire identification device mounted to the tire for providing a tire identification; and one or more tire inner liner deflection sensors mounted to provide a loaded inner liner radius measurement. An estimation of tire load is made from the measure tire pressure and the loaded inner liner radius measurement through the use of an RLS Algorithm receiving as inputs 28 the tire pressure, vehicle speed and inner liner radius measurement. From the inputs, the RLS algorithm derives an estimation of vehicle load. The RLS algorithm employed is a linear filter model such as a Kalman filter. The estimation of tire load is preferably made iteratively at a preselected sampling frequency on a per tire basis. The individual tire load estimations may be combined to formulate an estimate of the loaded vehicle. One or multiple tire inner liner deflection sensors may be mounted to the tire for use in measuring the inner liner radius. Commercially available sensors may be utilized for the intended purpose such laser distance sensors, eddy current sensors, magneto-inductive sensors or capacitive sensors. A combination of sensors of different type may be employed if desired for cross-validation of inner liner radius measuring results.

As discussed previously, while the use of inner liner deflection measurement is of use in estimating tire load, other applications are possible and foreseen. Such applications include but are not limited to aggregate vehicle load, tire longitudinal force, vehicle traversing road surface bank angle, vehicle road surface grade angle and vehicle sideslip angle. The common denominator in such possible applications is that all is loaded tire inner liner deflection measurement as input to an estimation algorithm for the purpose of achieving a useful vehicle parameter estimation.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire inner liner-based system for estimating a vehicle parameter comprising:
　　at least one tire supporting a vehicle, the tire having tire sidewalls and a tire crown supporting a tire inner liner defining a tire air cavity;
　　at least one tire pressure sensor mounted to the one tire for detecting a measured tire air cavity pressure;
　　at least one vehicle speed sensor mounted to provide a measured vehicle speed;
　　at least one tire identification device mounted to the tire for providing a tire identification;
　　at least one tire inner liner deflection sensor mounted to provide a loaded inner liner radius measurement;
　　estimating means for calculating a vehicle parameter estimation estimated tire parameter from the measured tire air cavity pressure and the loaded inner liner radius measurement; and
　　wherein the at least one tire inner liner deflection sensor is a sensor taken from the sensor group laser distance sensor, eddy current sensor, magneto-inductive sensor, capacitive sensor.

2. A tire inner liner-based system for estimating a vehicle parameter comprising:
　　at least one tire supporting a vehicle, the tire having tire sidewalls and a tire crown supporting a tire inner liner defining a tire air cavity;
　　at least one tire pressure sensor mounted to the one tire for detecting a measured tire air cavity pressure;
　　at least one vehicle speed sensor mounted to provide a measured vehicle speed;
　　at least one tire identification device mounted to the tire for providing a tire identification;
　　at least one tire inner liner deflection sensor mounted to provide a loaded inner liner radius measurement;
　　estimating means for calculating a vehicle parameter estimation estimated tire parameter from the measured tire air cavity pressure and the loaded inner liner radius measurement; and wherein the estimated vehicle parameter is one or more tire parameters taken from the group tire load; aggregate vehicle load, tire longitudinal force; vehicle road surface bank angle; vehicle road surface grade angle; vehicle sideslip angle.

3. A tire inner liner-based system for estimating a vehicle parameter comprising:
- at least one tire supporting a vehicle, the tire having tire sidewalls and a tire crown supporting a tire inner liner defining a tire air cavity;
- at least one tire pressure sensor mounted to the one tire for detecting a measured tire air cavity pressure;
- at least one vehicle speed sensor mounted to provide a measured vehicle speed;
- at least one tire identification device mounted to the tire for providing a tire identification;
- at least one tire inner liner deflection sensor mounted to provide a loaded inner liner radius measurement;
- estimating means for calculating a vehicle parameter estimation estimated tire parameter from the measured tire air cavity pressure and the loaded inner liner radius measurement; and
- wherein the estimating means comprises an estimation recursive least squares algorithm receiving as inputs the tire identification, the measured tire air cavity pressure, the loaded inner liner radius measurement and the measured vehicle speed.

4. The inner liner-based system of claim 3, wherein the least squares algorithm comprises a Kalman filter model.

5. The inner liner-based system of claim 2, wherein the estimating means is operative to apply the recursive least squares algorithm iteratively at a preselected sampling frequency.

6. A method of estimating a vehicle parameter from an inner liner deflected radius comprising:
- supporting a vehicle by at least one tire, the tire having tire sidewalls and a tire crown supporting a tire inner liner defining a tire air cavity;
- measuring a tire air cavity pressure by at least one tire pressure sensor mounted to the one tire;
- measuring a vehicle speed by at least one vehicle speed sensor;
- measuring a loaded inner liner radius by at least one tire inner liner deflection sensor;
- calculating an estimated vehicle parameter from the measured tire air cavity pressure and the loaded inner liner radius measurement; and
- wherein further comprising employing an estimation recursive least squares algorithm in calculating the estimated vehicle parameter utilizing the tire identification, the measured tire air cavity pressure, the loaded inner liner radius measurement, and the measured vehicle speed as inputs.

7. The method of claim 6, further comprising applying the recursive least squares algorithm iteratively at a preselected sampling frequency.

* * * * *